(12) United States Patent
Wang

(10) Patent No.: US 11,649,323 B2
(45) Date of Patent: May 16, 2023

(54) SEMICRYSTALLINE POLY(ARYL ETHER KETONE) COPOLYMERS

(71) Applicant: HT Materials Corporation, Clifton Park, NY (US)

(72) Inventor: YiFeng Wang, Clifton Park, NY (US)

(73) Assignee: HT MATERIALS CORPORATION, Clifton Park, NY (US)

( * ) Notice: Subject to any disclaimer, the term of this patent is extended or adjusted under 35 U.S.C. 154(b) by 144 days.

(21) Appl. No.: 17/190,727

(22) Filed: Mar. 3, 2021

(65) Prior Publication Data

US 2021/0380762 A1     Dec. 9, 2021

Related U.S. Application Data

(60) Provisional application No. 63/036,742, filed on Jun. 9, 2020.

(51) Int. Cl.
| | |
|---|---|
| *C08G 73/06* | (2006.01) |
| *C08K 7/14* | (2006.01) |
| *C08L 79/04* | (2006.01) |
| *C08K 3/04* | (2006.01) |
| *C08K 7/06* | (2006.01) |

(52) U.S. Cl.
CPC .......... *C08G 73/0677* (2013.01); *C08K 3/042* (2017.05); *C08K 7/06* (2013.01); *C08K 7/14* (2013.01); *C08L 79/04* (2013.01)

(58) Field of Classification Search
CPC ...... C08G 73/0677; C08G 8/02; C08G 65/38; C08G 65/40; C08K 3/042; C08K 3/40; C08K 3/04; C08K 3/046; C08K 7/06; C08K 7/02; C08K 7/14; C08K 13/02; C08K 5/0008; C08L 79/04; C08L 61/00; C08L 61/16; C08L 61/34
See application file for complete search history.

(56) References Cited

U.S. PATENT DOCUMENTS

| | | | | |
|---|---|---|---|---|
| 4,774,311 A * | 9/1988 | Kelsey | ................... | C08G 65/48 528/125 |
| 8,609,801 B2 * | 12/2013 | Hay | ................... | C08G 65/4037 528/226 |
| 2006/0094852 A1 * | 5/2006 | Yuan | ................... | C08L 79/08 528/125 |
| 2007/0197739 A1 * | 8/2007 | Aneja | ................... | C08L 71/10 525/437 |
| 2009/0082538 A1 * | 3/2009 | Wu | ................... | C08G 65/4012 528/128 |
| 2011/0218315 A1 * | 9/2011 | Wu | ................... | C08G 65/40 528/219 |
| 2012/0095182 A1 * | 4/2012 | Wu | ................... | C08G 65/4012 528/126 |

FOREIGN PATENT DOCUMENTS

| | | | | |
|---|---|---|---|---|
| CN | 1353125 A | * | 6/2002 | ............... C08G 8/02 |
| CN | 103450478 A | * | 12/2013 | ............. C08G 73/06 |
| CN | 103509185 A | * | 1/2014 | ............. C08G 73/06 |

OTHER PUBLICATIONS

Machine translation of CN 103450478 A to Zhou et al. published Dec. 18, 2013 (Year: 2013).*
Machine translation of CN 103509185 A to Zhou et al. published Jan. 15, 2014 (Year: 2014).*
Machine translation of CN 1353125 A to Wu et al. published Dec. 6, 2002 (Year: 2002).*

* cited by examiner

*Primary Examiner* — Jane L Stanley
(74) *Attorney, Agent, or Firm* — Cantor Colburn LLP

(57) ABSTRACT

Compositions and methods for semicrystalline poly(aryl ether ketone) copolymers incorporating 2-benzimidazolinone and hydroquinone as comonomer units with 4,4'-dihalobenzophenone, and compositions and methods for semicrystalline poly(aryl ether ketone) copolymers incorporating 2-benzimidazolinone and hydroquinone as comonomer units with 1,4-bis(4-dihalobenzoyl)benzene are described herein. The copolymers have advantageous properties, particularly in terms of their glass transition temperatures ($T_g$), crystallization temperatures from melt ($T_c$), melting temperatures ($T_m$), crystallinity and chemical resistance. The copolymers are suitable for manufacturing high temperature and chemical resistance molded systems and other articles of manufacture via injection molding, extrusion, compression molding, thermoforming and additive manufacturing.

22 Claims, 9 Drawing Sheets

SEMICRYSTALLINE POLY(ARYL ETHER KETONE) COPOLYMERS

CROSS-REFERENCE TO RELATED APPLICATIONS

The present application claims priority from U.S. Provisional Patent Application Ser. No. 63/036,742, filed on Jun. 9, 2020 which is incorporated by reference in its entirety as if fully set forth.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A "SEQUENCE LISTING," A TABLE, OR A COMPUTER PROGRAM

Not Applicable

STATEMENT REGARDING PRIOR DISCLOSURES BY THE INVENTOR OR A JOINT INVENTOR

Not Applicable

FIELD OF THE INVENTION

The present invention generally relates to semicrystalline poly(aryl ether ketone) copolymer compositions with lower melting temperature, lower crystallization temperature, and higher glass transition temperature, to methods to prepare such semicrystalline poly(aryl ether ketone) copolymers, as well as to shaped articles of such semicrystalline poly(aryl ether ketone) copolymers via additive manufacturing or 3D printing, injection molding, extrusion and thermoforming, and to thermoplastic composite comprising such semicrystalline poly(aryl ether ketone) copolymers.

BACKGROUND OF THE INVENTION

The present invention generally relates to semicrystalline poly(aryl ether ketone) copolymer compositions with lower melting temperature, lower crystallization temperature, and higher glass transition temperature, to methods to prepare such semicrystalline poly(aryl ether ketone) copolymers, as well as to shaped articles of such semicrystalline poly(aryl ether ketone) copolymers via additive manufacturing or 3D printing, injection molding, extrusion, compression molding, rotational molding and thermoforming, and to thermoplastic composite comprising such semicrystalline poly(aryl ether ketone) copolymers.

Poly(aryl ether ketone) polymers (PAEK), such as poly (ether ether ketone) (PEEK), poly(ether ketone) (PEK) and poly(ether ketone ketone) (PEKK) polymers, are known for their high temperature performance, excellent chemical resistance, inherent flame resistance, low smoke toxicity, high strength and low weight. PAEK has been widely used in various demanding applications in oil and gas production, components for electronics, industrial and automotive, and medical devices. However, because of their high melting temperatures ($T_m$) and high crystallization temperatures, their processing temperatures require costlier, energy-intensive processing. Their high melting temperatures ($T_m$) can also result in polymers being unstable during processing, especially when the polymers must be kept at a temperature above or just below their melting temperature for extended periods of time. Examples of such applications include additive manufacturing (AM), also called 3D printing, powder coatings and continuous fiber reinforced thermoplastic composites.

Advantages of additive manufacturing can be deployed to reduce costs, shorten time to market, and enable the production of parts too complex to be manufactured using traditional methods. Additive manufacturing includes filament fusion (FF) and laser sintering (LS). With the advent of additive manufacturing, there were initial expectations that the combination of this process and materials, PAEK had the potential to create the new lightweight, bio-inspired, strong parts that can meet the objective of increased fuel efficiency, simplified manufacture and long-term reliability for applications in electronics, medical and automotive industries.

The PEEK incumbent materials on the market today such as Victrex PEEK 450 and Victrex PEEK 150, although used in some additive manufacturing applications, were designed for conventional manufacturing methods, such as extrusion, injection molding and machining. PEEK material typical has a glass transition temperature ($T_g$) of 143° C., and crystallization temperature from melt ($T_c$) of 285 to 290° C., and a melting temperature ($T_m$) of 343° C. Due to its high melting temperature, PEEK is typically processed at 380 to 400° C. Due to its high crystallization temperature from melt, injection molding is typically carried out with hot mold with a mold temperature of at least 180° C., and requires highly specialized and costly molding tools.

PEEK material for Laser Sintering can only be recycled in a very low extent and required nearly full refresh of the printing bed with new powder due to degradation at high temperatures, and PEEK filaments available for filament fusion (FF) have poor interlayer bonding, due to high crystallization temperature and fast rate of crystallization, leading to a loss in Z-strength. The high processing temperature of PEEK material limits the additive manufacturing machines on which PEEK could be processed and increased the challenges involved in controlling warpage and shrinkage.

Polyetherkeone (PEK), another type of PAEK polymers, such as Victrex PEEK-HT, has a glass transition temperature ($T_g$) of 160° C. and a melting temperature of 373° C. The melting temperature is too high to be processed in commercially available additive manufacturing process.

Polyetherketoneketone (PEKK), another class of PAEK polymers, such as Cypek® DS-E from Solvay on the other hand can offer melting temperature ($T_m$) as low as 300° C. but is completely amorphous and does not offer required chemical resistance and heat resistance for most demanding applications. These factors are limiting the potential development of these PAEK materials in additive manufacturing.

In U.S. Pat. No. 10,023,691, Carlo Capra et al teach a class of semicrystalline PAEK copolymer with repeating unit of formula PEEEK having structure

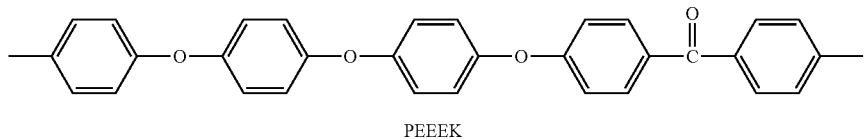

PEEEK and repeating unit of formula PEBEK having structure

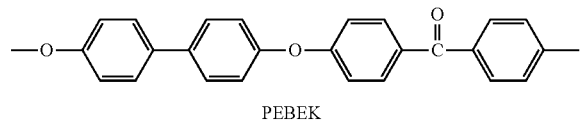

PEBEK wherein the molar ratios (PEEEK:PEBEK) of formula PEEEK and formula PEBEK are from 70:30 to 80:20.

This class of semicrystalline PAEK copolymer has melting temperature of 283° C. to 295° C. and glass transition temperature of 133° C. to 139° C. The lower melting temperatures of the PAEK copolymer allow additive manufacturing processed at much lower temperatures than PEEK material, resulting in improvement in both recycling of unsintered powder in laser sintering process due to minimized degradation of the polymer at processing conditions, and better Z-strength and better printability in filament fusion process due to improved interlayer bonding strength. These improvements expand the potential use of PAEK for additive manufacturing in a wide range of applications. However, the lower glass transition temperature (133-139° C.) is limiting its ability to withstand continuous operations at temperatures of 140° C. or beyond due to poor creep resistance and dimensional stability at elevated temperatures.

In U.S. Pat. No. 8,609,801, Hay et al teach a new class of polymers and copolymers containing 2H-benzmidazol-2-one moieties. In particular, Hay et al disclose a PAEK copolymer with repeating unit of formula A having structure

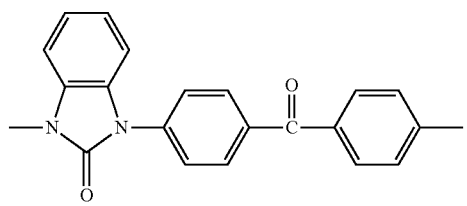

A and repeating unit of formula B having structure

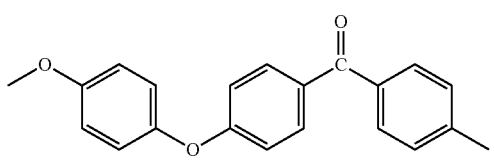

B wherein the molar ratios (A:B) of formula A and formula B are from 12.5:87.5 to 30:70. When a molar ratio (A:B) of formula A and formula B is 12.5:87.5, a copolymer was reported to have a $T_g$ of 163° C., a $T_m$ of 306° C. and crystallization temperature from melt ($T_c$) of 234° C. However, there were no melting endotherm and crystallization exotherm reported.

When a molar ratio (A:B) of formula A and formula B is 30:70, a copolymer was reported to have a $T_g$ of 186° C., a $T_m$ of 270° C. with no detectable crystallization temperature. There was also no melting endotherm and crystallization exotherm reported.

Hay et al also disclose a PAEK copolymer with repeating unit of formula A having structure

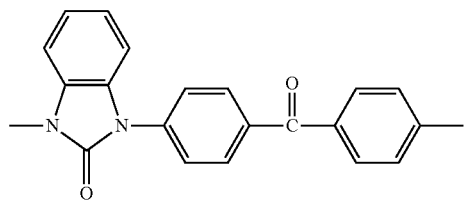

A and repeating unit of formula C having structure

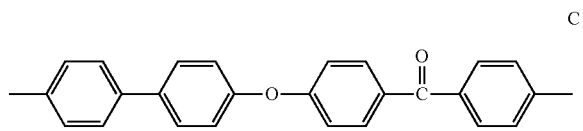

C

Wherein the molar ratios (A:C) of formula A and formula C are from 30:70 to 70:30.

When a molar ratio (A:C) of formula A and formula C is 70:30, a copolymer was reported to have a $T_g$ of 235° C. with no melting temperature or crystallization temperature, and when a molar ratio (A:C) of formula A and formula C is 30:70, a copolymer was reported to have a $T_g$ of 217° C. with no melting temperature or crystallization temperature, indicating that the copolymer is amorphous material.

There is hence a continuous quest in the art for poly(aryl ether ketone) (PAEK) polymers possessing an advantageous combination of thermal performances, chemical resistance, and ease of processability, while maintaining outstanding mechanical performances, so as to provide materials suitable for being used in a wide range of applications such as additive manufacturing, injection molding, thermoforming, and composite materials fabrication.

Accordingly, a need exists for new semicrystalline PAEK polymers that can be reliably processed at low temperatures, and which retain their technical properties, notably their chemical resistance and mechanical properties (when compared with conventional PEEK polymer and PEK polymer).

BRIEF SUMMARY OF THE INVENTION

The present invention provides a semicrystalline poly (aryl ether ketone) copolymer that incorporates 2-benzimidazolinone and hydroquinone as co-monomer units with 4,4'-dihalobenzophenone. The present invention also provides another semicrystalline poly(aryl ether ketone) copolymer that incorporates 2-benzimidazolinone and hydroquinone as comonomer units with 1,4-bis(4-halobenzoyl) benzene. The semicrystalline PAEK copolymers containing 2-benzimidazolinone and hydroquinone comonomer units according to the current invention have advantageous properties, particularly in terms of their glass transition temperatures ($T_g$), crystallization temperatures from melt ($T_c$), melting temperatures ($T_m$), crystallinity and chemical resistance. These advantageous properties are unexpectedly achieved with addition of less than 10 mol % of 2-benzimidazolinone as comononer for copolymers from 4,4'-dihalobenzophenone, or less than 30 mol % of 2-benzimidazolinone as comonomer for copolymers from 1,4-bis(4-fluorobenzoyl) benzene, and using hydrophilic organic solvent N-cyclohexyl-2-pyrrolidone (CHP) as polymerization solvent. The said semicrystalline PAEK copolymers are suitable for manufacturing high temperature and chemical resistance molded systems and other articles of manufacture via injection molding, extrusion and additive manufacturing.

Another embodiment of this invention produces semicrystalline copolymers of these instant chemical structures that exhibit thermal characteristics of a semicrystalline copolymer under the conditions subsequently defined herein.

DESCRIPTION AND DEFINITION OF TERMS

Definition of Terms

Figure 1:
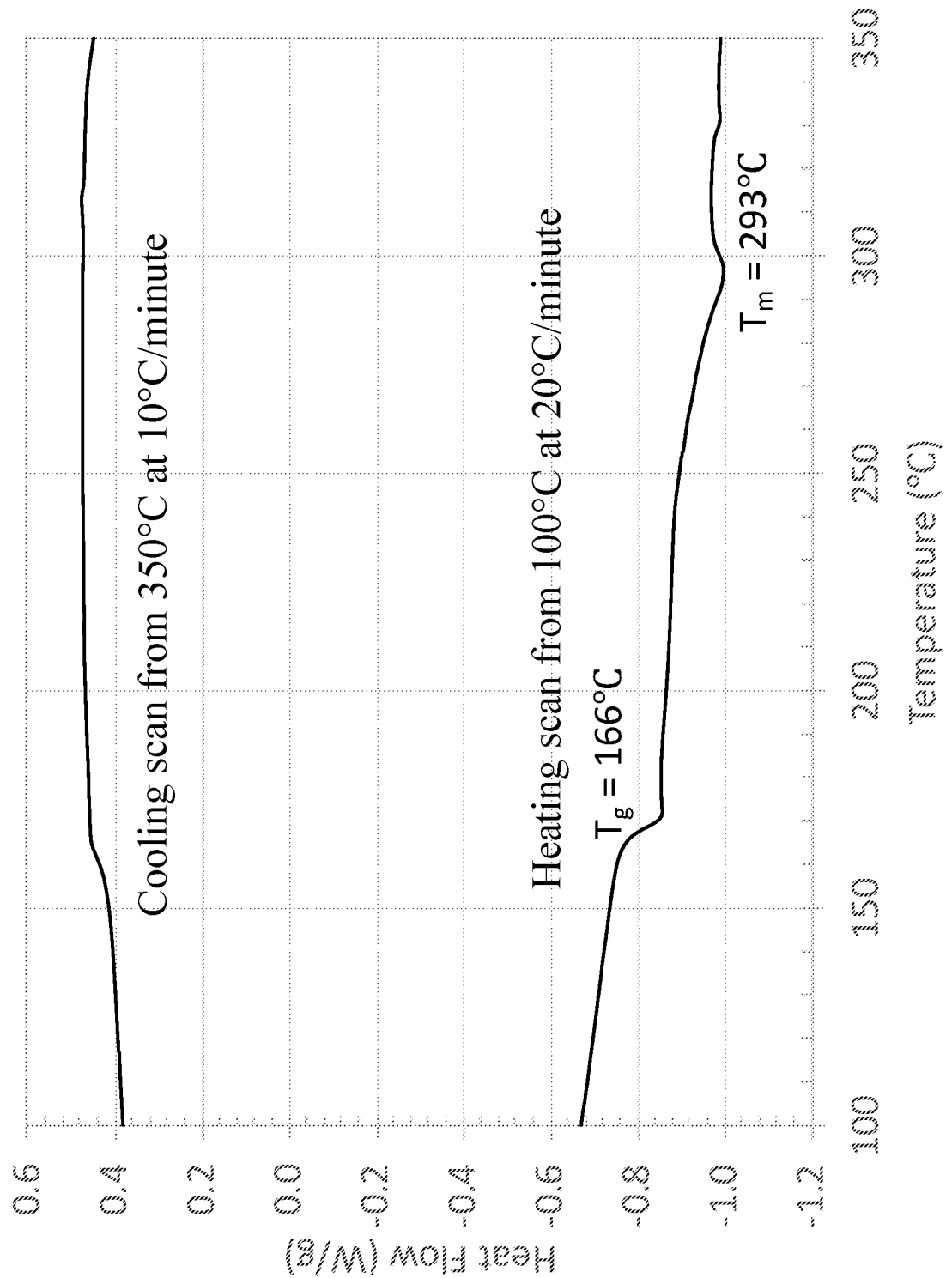
FIG. 1 is a graphical plot of DSC cooling scan curve (upper curve) at 10° C./minute and a heating scan curve (lower curve) at 20° C./minute for the PAEK copolymer of Comparative Example A. The cooling curve does not show crystallization exotherm peak. The heating curve shows a glass transition and a minor melting endotherm peak.

As referred to in this application, the following definition and terms are used: "DSC" means Differential Scanning calorimetry (DSC) which is an analytical technique used to investigate the response of polymers to heating. DSC is used to study the glass transition, melting and crystallization of polymers.

"Copolymer" means polymer made from three or more monomers via polycondensation reaction, preferably made from bisphenol or bisphenol equivalent compounds with dihalo aromatic ketone compounds. The bisphenol or bisphenol equivalent compound is selected from hydroquinone and 2-benzimidazolinone, and the dihalo aromatic ketone compound is selected from 4,4'-dihalobenzophone and 1,4-bis(4-halobenzoyl)benzene.

"$T_g$" means glass transition temperature from second DSC heating scan at 20° C./minute after cooling from melt.

"$T_m$" means the peak temperature at which the melting endotherm is observed from second DSC heating scan at 20° C./minute after cooling from melt.

"$T_c$" means peak temperature at which crystallization exotherm is observed from first DSC cooling scan at 20° C./minute after melt.

"$\Delta H_m$" means enthalpy of melting endotherm observed from second DSC heating scan.

"$\Delta H_c$" means enthalpy of crystallization exotherm observed from first DSC cooling scan.

"Semicrystalline" means a polymer of present invention with detectable $T_c$ from first DSC cooling scan with a cooling rate at least at 5° C./minute but at less than 250° C./minute from melt and a $\Delta H_m$ of at least 10 J/g but less than 55 J/g from second DSC heating scan. The cooling rate is preferably selected as 20° C./minute.

"Amorphous" means a polymer with no detectable $T_c$ from first DSC cooling scan with a cooling rate at least at 5° C./minute but at less than 250° C./minute from melt and a $\Delta H_m$ of less than 5 J/g from second DSC heating scan. The cooling rate is preferably selected as 20° C./minute.

"Crystalline" means a polymer of present invention with detectable $T_c$ from first DSC cooling scan with a cooling rate at least at 5° C./minute but at less than 250° C./minute from melt and a $\Delta H_m$ of at least 55 J/g from second DSC heating scan. The cooling rate is preferably selected as 20° C./minute. The words repeating and recurring are used interchangeably herein.

DESCRIPTION OF THE INVENTION

A preferred embodiment of the present invention addresses the problems described in the Background of the Invention.

A second embodiment of the present invention provides a semicrystalline PAEK copolymer which has a relatively low $T_m$ (lower than 340° C.) but which has a higher $T_g$ (higher than 150° C.).

A third embodiment of the present invention provides a semicrystalline PAEK copolymer which has a relative low $T_m$ (lower than 360° C.) but which has a $T_g$ higher than 170° C.

The preferred embodiments of the invention are useful in providing advantageous semicrystalline PAEK materials for use in additive manufacturing, composite materials, coating, injection molding, extrusion, blow molding, rotational molding and thermoforming.

In one aspect of the invention, there is provided a semicrystalline PAEK copolymer having a recurring unit of formula, formula I:

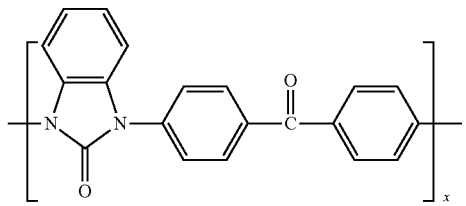

and a recurring unit of formula, formula II:

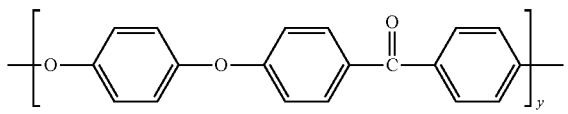

Wherein x is from 1 to 5000, and y is from 1 to 5000; and the ratios (x:y) of recurring unit of formula I and recurring unit of formula II are in such a range (about 1:99 to about 10:90) that resulting semicrystalline copolymer has a glass transition temperature, a melting temperature and a crystallization temperature under cooling at cooling rate from 5° C./minute to 250° C./minute (preferably at 20° C./minute) after melted at 350 or 380° C. In particular, the semicrystalline copolymer according to the current invention has a $T_g$ of about 150 to about 170° C. with a melting temperature $T_m$ of about 290° C. to about 340° C., an enthalpy of melting endotherm $\Delta H_m$ of about 10 J/g to 54 J/g, a crystallization temperature $T_c$ from melt of about 210° C. to about 275° C. and an enthalpy of crystallization exotherm $\Delta H_c$ of about 10 J/g to about 54 J/g with a cooling rate of 20° C./minute.

In another aspect of the invention, there is provided a PAEK polymer or copolymer having a recurring unit of formula, formula III:

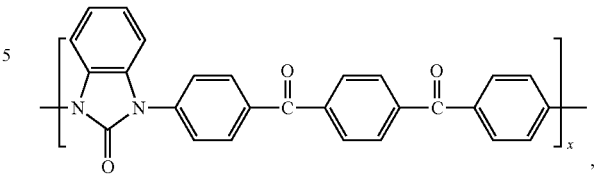

and a recurring unit of formula, formula IV:

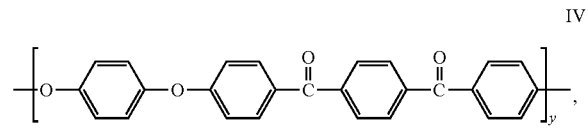

Wherein x is from 1 to 5000, and y is from 0 to 5000, and the ratio of x:y ranges from 1:99 to 100:0.

In still another aspect of the invention, there is provided a semicrystalline PAEK copolymer wherein the ratios (x:y) of recurring unit of formula III and recurring unit of formula IV are in such a range (about 1:99 to about 25:75) that resulting semicrystalline copolymer has a glass transition temperature, a melting temperature and a crystallization temperature under cooling at cooling rate from 5° C./minute to 250° C./minute (preferably at 20° C./minute) after melted at 380° C. In particular, the semicrystalline copolymer according to the current invention, wherein the ratio (x:y) of formula III and formula IV is from 1:99 to 25:75, has a $T_g$ of about 165° C. to about 185° C. with a melting temperature $T_m$ of about 320° C. to about 360° C., an enthalpy of melting endotherm $\Delta H_m$ of about 10 J/g to 54 J/g, a crystallization temperature from melt $T_c$ of about 210° C. to about 330° C. and an enthalpy of crystallization exotherm $\Delta H_c$ of about 10 J/g to about 54 J/g with a cooling rate of 20° C./minute.

The level and extent of crystallinity may be assessed by Differential Scanning calorimetry (DSC) in a process such as the following which is also described in POLYMER Vol. 37 Number 20, 1996, page 4573.

DSC may be used to examine a 10±2 mg sample of PAEK copolymer in a TA Instruments DSC Q2000 under nitrogen at a flow rate of 50 ml/min. The scan procedure may be:
Step 1: Perform a preliminary thermal cycle by heating the sample from 50° C. to 350 or 380° C. at 20° C./minute
Step 2: Hold at 350° C. or 380° C. for 3 minutes
Step 3: Cool to 50° C. at 20° C./minute, record the $T_c$
Step 4: Heat from 50° C. to 350° C. or 380° C. at 20° C./minute, record $T_g$ and $T_m$
From the resulting second heating scan the onset of the $T_g$ may be obtained as the intersection of lines drawn along the pretransition baseline and a line drawn along the greatest slope obtained during the transition. $T_m$ is the temperature at which main peak of the melting endotherm reaches maximum. $T_c$ is the temperature at which the crystallization exotherm from melt reaches maximum. The Heat of Crystallization $\Delta H_c$ (J/g) may be obtained from the first cooling scan by connecting the two points at which the crystallization exotherm deviates from the relatively straight baseline. The integrated area under the exotherm as a function of time yields the enthalpy (mJ) of the transition, the mass normalized Heat of Crystallization is calculated by dividing the enthalpy by the mass of the specimen (J/g). The Heat of Fusion $\Delta H_m$ (J/g) may be obtained from the second heating scan by connecting the two points at which the melting endotherm deviates from the relatively straight baseline. The integrated area under the endotherm as a function of time yields the enthalpy (mJ) of the transition, the mass normalized Heat of Fusion is calculated by dividing the enthalpy by the mass of the specimen (J/g). The level of crystallization (%) is determined by dividing the Heat of Fusion of the specimen by the Heat of Fusion of a totally crystalline polymer, which for PEEK is 130 J/g.

The $T_m$ of said PAEK copolymer may be less than 360° C. but greater than 290° C., is suitably less than 345° C. but greater than 295° C., is preferably less than 330° C. but greater than 300° C. The $T_m$ is preferably in the range of 295° C. to 350° C.

The $T_g$ of said PAEK copolymer may be greater than 150° C. but less than 185° C., preferably greater than 155° C. and less than 180° C. The $T_g$ is preferably in the range of 153° C. to 180° C.

The $T_m$ of said PAEK copolymer is greater than its $T_g$ by at least 140° C., preferably by at least 165° C., more preferably by at least 170° C. The $T_m$ is greater than the $T_g$ by less than 210° C. or less than 200° C. In a preferred embodiment, the $T_m$ is greater than the $T_g$ by about 145° C. to about 195° C.

In a preferred embodiment, said PAEK copolymer has a $T_g$ in the range of 150° C. to 180° C., a $T_m$ in the range of 295° C. to 345° C. and the $T_m$ is greater than the $T_g$ by about 145° C. to about 175° C.

Said PAEK copolymer may have a crystallinity, measured by DSC method as described above, of at least 7.5%, preferably at least 15%, more preferably at least 20%. The crystallinity may be less than 45% or less than 30%.

Said PAEK polymer or copolymer suitably has an inherent viscosity (IV) of about 0.3 to about 4.0 dL/g. The inherent viscosity of PAEK copolymer is suitably measured pursuant to ASTM D2857 standard at 30° C. on 0.5 wt/vol % solution in concentrated $H_2SO_4$ (96 wt %) and expressed in dL/g using a Cannon-Fenske capillary, size 200.

Said PAEK copolymer comprising repeating units of formula I and repeating units of formula II should include at no more than 9.5 mol %, preferably less than 9.0 mol %, more preferably less than 7.0 mol %, most preferably less than 5.0 mol % of repeat units of formula I. Said PAEK material may include 1.0 to 9.5 mol %, preferably 2.0 to 9.0 mol %, more preferably 2.5 to 8.0 mol % repeating units of formula I.

Said PAEK copolymer comprising repeating units of formula I and repeating units of formula II should include at least 90.0 mol %, preferably at least 92.0 mol %, of repeating units of formula II. Said PAEK material may include 90.5 to 99.0 mol %, preferably 92.0 to 98.0 mol %, more preferably 93.0 to 97.0 mol % of repeating units of formula II. The ratio of repeating units of formula II and repeating units of formula I, defined as the mol % of repeating units of formula II divided by the mol % of repeating units of formula I, may be in the range of 9.0 to 99.0, is preferably in the range of 11.5 to 49.0 and is more preferably in the range of 12.3 to 19.0.

In one aspect, the PAEK copolymer comprising repeating units of formula III and repeating units of formula IV may include 1 to 100 mol % repeating units of formula III.

In another aspect, said PAEK copolymer comprising repeating units of formula III and repeating units of formula IV should include at no more than 25.0 mol %, preferably less than 20.0 mol %, more preferably less than 15.0 mol %, especially less than 13.0 mol % of repeating units of formula III. Said PAEK copolymer may include 1.0 to 25.0 mol %, preferably 10.0 to 20.0 mol %, more preferably 10.0 to 18.0 mol % repeating units of formula III.

Said PAEK copolymer comprising repeating units of formula III and repeating units of formula IV may include at least 75.0 mol %, preferably at least 80.0 mol % of repeating units of formula IV. Said PAEK material may include 75.0 to 99.0 mol %, preferably 80.0 to 90.0 mol %, more preferably 83.0 to 89.0 mol % of repeating units of formula IV. The ratio of repeating units of formula IV and repeating units of formula III, defined as the mol % of repeating units of formula IV divided by the mol % of repeating units of formula III, may be in the range of 3.0 to 99.0, is suitably in the range of 4.0 to 19.0 and is preferably in the range of 4.5 to 11.5.

Said PAEK copolymer may be in monofilament form with a diameter in a range of 0.1 mm to 5.0 mm. The monofilament of the said PAEK material can be used in filament fusion fabrication 3D printing or other rapid prototyping method.

Said PAEK copolymer may be in powder form with particle size (D90) less than 200 μm. The powder of the said PAEK copolymer can be used in SLS 3D printing or other rapid prototyping method, in compression molding or in electrostatic or solvent-borne powder coating.

Said PAEK copolymer can be melt blended with one or more other polymers which include but not limited to polybenzimidazole, polyarylamides, polysulfones, polyketones, polyimides, polyetherimides, polyphenylenesulfides, fluoropolymers, polyamides, polyesters and polycarbonates.

Said PAEK copolymer may be part of a composition which may include said PAEK copolymer and a filler. Said filler may include both a fibrous filler and a non-fibrous filler.

The said fibrous filler may be continuous or discontinuous.

The said fibrous filler may be selected from inorganic fibrous materials, non-melting and high-melting organic fibrous materials, such as aramid fiber, and carbon fiber.

The said fibrous filler may be selected from glass fiber, carbon fiber, silica fiber, alumina fiber, zirconia fiber, boron nitride fiber, silicon nitride fiber, boron fiber, fluorocarbon resin fiber and potassium titanate fiber. Preferred fibrous fillers are glass fiber and carbon fiber.

The said fibrous filler may comprise nanofibers.

The said non-fibrous filler may be selected from (i) colorants such as notably a dye, (ii) pigments such as notably titanium dioxide, zinc sulfide and zinc oxide, (iii) light stabilizers, e.g. UV stabilizers, (iv) heat stabilizers, (v) antioxidants such as notably organic phosphites and phosphonites, (vi) acid scavengers, (vii) processing aids, (viii) nucleating agents, (ix) internal lubricants and/or external lubricants, (x) flame retardants, (xi) smoke-suppressing agents, (xii) anti-static agents, (xiii) anti-blocking agents, (xiv) conductivity additives such as notably carbon black, graphite, graphene, carbon nanofibrils, and metallic filler, (xv) plasticizers, (xvi) flow modifiers, (xvii) extenders, (xviii) metal deactivators and combinations comprising one or more of the foregoing non-fibrous fillers.

The non-fibrous fillers may be introduced in the form of powder or flaky particles.

Said composition may define a composite material which could be prepared as described in *Impregnation Techniques for Thermoplastic Matrix Composites*. A Miller and A G Gibson, *Polymer & Polymer Composites* 4(7), 459-481 (1996), the contents of which are incorporated herein by reference. Preferably, in the method, said PAEK copolymer and said filler means are mixed at an elevated temperature of said PAEK copolymer. Thus suitably, said PAEK copolymer and filler means are mixed whilst the PAEK copolymer is molten. Said elevated temperature is suitably below the decomposition temperature of the PAEK copolymer. Said elevated temperature is preferably at or above the main peak of the melting endotherm ($T_m$) for said PAEK copolymer. Said elevated temperature is preferably at least 300° C. Advantageously, the molten PAEK copolymer can readily wet the filler and/or penetrate consolidated fillers, such as fibrous mats or woven fabrics, so the composite material prepared comprises the PAEK copolymer and filler means which is substantially uniformly dispersed throughout the PAEK copolymer.

The composite material may be prepared in a substantially continuous process. In this case PAEK copolymer and filler means may be constantly fed to a location wherein they are mixed and heated. An example of such a continuous process is extrusion. Another example (which may be particularly relevant wherein the filler means comprises a fibrous filler) involves causing a continuous filamentous mass to move through a melt comprising said PAEK copolymer. The continuous filamentous mass may comprise a continuous length of fibrous filler or, more preferably, a plurality of continuous filaments which have been consolidated at least to some extent. The continuous fibrous mass may comprise a tow, roving, braid, woven fabric or unwoven fabric. The filaments which make up the fibrous mass may be arranged substantially uniformly or randomly within the mass.

Alternatively, the composite material may be prepared in a discontinuous process. In this case, a predetermined amount of said PAEK copolymer and a predetermined amount of said filler may be selected and contacted and a composite material prepared by causing the PAEK copolymer to melt and causing the PAEK copolymer and filler to mix to form a substantially uniform composite material.

The composite material may be formed into a particulate form for example into pellets or granules. Pellets or granules may have a maximum dimension of less than 20 mm, preferably less than 7.5 mm, more preferably less than 5.0 mm.

Preferably, said filler means comprises one or more fillers selected from glass fiber, carbon fiber, carbon black and a fluorocarbon resin. More preferably, said filler means comprises glass fiber or carbon fiber.

A composition or composite material as described may include 10 to 95 wt % of said PAEK copolymer and 5 to 90 wt % of filler. Preferred embodiments include greater than 40 wt % of filler.

The said semicrystalline PAEK copolymer and/or composition, as above detailed, can be processed by usual melt processing techniques, including notably extrusion, injection molding, compression molding, thermoforming, coating and additive manufacturing, so as to provide shaped articles.

According to certain embodiments shaped articles are under the form of substantially bidimensional articles, e.g., parts wherein one dimension (thickness or height) is significantly less than the other two characterizing dimensions (width and length), such as notably fibers, films and sheets.

According to other embodiments, shaped articles are provided as three-dimensional parts, e.g., substantially extending in the three dimensions of space in similar manner, including under the form of complex geometries parts, e.g., with concave or convex sections, possibly including undercuts, inserts, and the like.

Another object of the present invention is a method of making a semicrystalline PAEK copolymer, as above set forth, comprising reacting at least one dihalo-derivative of the formula, formula V:

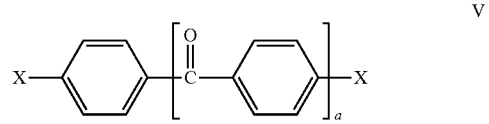

with a mixture of compound of the formula, formula VI:

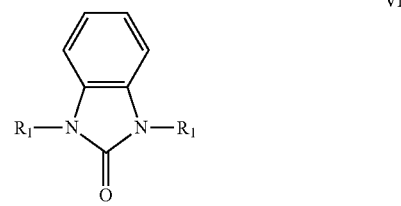

and compound of the formula, formula VII:

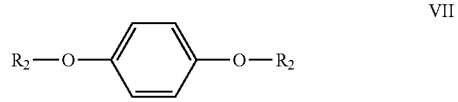

wherein a is 1 or 2, each X is selected from a chlorine and fluorine atom, R1 is selected from an alkali metal and a hydrogen atom and R2 is selected from an alkali metal and a hydrogen atom, in a molar ratio (VI:VII) of 9.5:90.5 to 1.0:99.0 wherein a in formula V is selected as 1, or in a molar ratio (VI:VII) of 99:1 to 25:75 wherein a in formula V is selected as 2, in a hydrophilic organic solvent N-cyclohexyl-2-pyrrolidone in the presence of an alkali metal carbonate or a mixture of alkali metal carbonates. Suitably, the number of moles of monomers which include chlorine or fluorine atoms which are polycondensed in the method are in slight molar excess over the number of moles of monomers which include alkali metal or hydrogen end groups.

The technical approach to polymerization of the said semicrystalline PAEK copolymer differs significantly from the art, including the U.S. Pat. No. 8,609,801 to Hay. In contrast to the art, the polymerization herein is carried out in a hydrophilic polar solvent that is liquid at room temperature, and the resulting polymers are semicrystalline. In addition, the present invention discloses polymerization reactions conducted at significantly lower temperatures, generally between about 200° C. and about 285° C. After polymerization, the PAEK copolymer is isolated via one simple mixing with de-ionized water, and further purified with additional washing with de-ionized water to remove any residual inorganic salts. The hydrophilic polar solvent is easily recovered from the mixture with de-ionized water. In contrast, PAEK copolymers from hydroquinone in Hay's patent (U.S. Pat. No. 8,609,801) are processed at temperatures of 300° C. to 320° C. in an aprotic polar solvent (diphenylsulfone) that is solid at room temperature. The synthesis method in U.S. Pat. No. 8,609,801 requires tedious extraction with large amount of organic solvent such as acetone to isolate the polymer from diphenylsulfone, followed by tedious extraction with large amount of de-ionized water to remove inorganic salts in the polymer.

The said semicrystalline PAEK copolymer of the present invention can be prepared in solution by heating the monomers dissolved in hydrophilic organic solvent N-cyclohexyl-2-pyrrolidone (CHP) with anhydrous alkali metal carbonate or a mixture of alkali metal carbonates. The alkali metal carbonates are typically sodium carbonate, potassium carbonate or a mixture of sodium carbonate, potassium carbonate and cesium carbonate. The alkali metal carbonates can be anhydrous. Water formed during initial reaction can be removed, e.g., by dehydration via azeotropic distillation with organic solvent such as toluene or xylene or chlorobenzene, prior to reaching the polymerization temperature.

The total amount of alkali metal carbonate used can be such that there is at least 1 atom of alkali metal for each OH or NH group. An excess of alkali metal carbonate can be employed, and there may be 1.0 to 1.2 atoms of alkali metal per phenol OH or NH group.

In various embodiments of the present invention, the polymerization is carried out in hydrophilic organic solvent N-cyclohexyl-2-pyrrolidone (CHP) at below its boiling point (284° C.) under ambient pressure. In certain embodiments, the polymerization is carried out at temperatures from about 130° C. to about 284° C. In some embodiments, the polymerization temperature is from about 150° C. to about 260° C.

It is preferable that the monomers (V), (VI) and (VII) are heated, in the method of the invention, at a first temperature of at least 130° C., preferably at least 140° C., more preferably at least 150° C. in presence of $K_2CO_3$ and azeotropic solvent to form OK group and NK group. The reaction is generally pursued by heating the resulting mixture at a temperature of about 160° C. to about 180° C. to dehydrate the reaction mixture with removal of water via azeotropic distillation. The dehydrated reaction mixture is then heated to a temperature of preferably at least 190° C., preferably at least 230° C., and more preferably at least 260° C., at a temperature ramp rate of less than 20° C./minute, preferably less than 10° C./minute and/or at a temperature ramp rate of less than 5° C./minute. Once the final target temperature is attained, the reaction is generally continued for a limited time at this temperature, before being terminated.

It is also preferable that the monomers (VI) and (VII) are heated, in the method of the invention, at a first temperature of at least 130° C., preferably at least 140° C., more preferably at least 150° C. in presence of $K_2CO_3$ and azeotropic solvent to form OK group and NK group. The reaction is generally pursued by heating the resulting mixture at a temperature of about 160° C. to about 180° C. to dehydrate the reaction mixture with removal of water via azeotropic distillation. Monomer (V) is then added to the dehydrated reaction mixture, and the reaction mixture is then heated to a temperature of preferably at least 190° C., preferably at least 230° C., and more preferably at least 260° C., at a temperature ramp rate of less than 20° C./minute, preferably less than 10° C./minute and/or at a temperature ramp rate of less than 5° C./minute. Once the final target temperature is attained, the reaction is generally continued for a limited time at this temperature, before being terminated.

It is also preferable that the monomers (V) and (VI) are heated, in the method of the invention, at a first temperature of at least 130° C., preferably at least 140° C., more preferably at least 150° C. in presence of $K_2CO_3$ and azeotropic solvent to form NK group. The reaction is generally pursued by heating the resulting mixture at a temperature of about 160° C. to about 180° C. to dehydrate the reaction mixture with removal of water via azeotropic distillation. The dehydrated reaction mixture is then heated to a temperature of preferably at least 190° C., preferably at least 200° C., and more preferably at least 220° C., at a temperature ramp rate of less than 10° C./minute. Once the final target temperature is attained, the reaction is generally continued for a limited time at this temperature. It was then cooled to temperature less than 170° C., and monomer (VII) was added along with azeotropic solvent. The reaction mixture was then heated to at least 150° C. for a limited time to form phenol OK group. The reaction is generally pursued by heating the resulting mixture at a temperature of about 160° C. to about 180° C. to dehydrate the reaction mixture with removal of water via azeotropic distillation. The dehydrated reaction mixture is then heated to a temperature of preferably at least 190° C., preferably at least 230° C., and more preferably at least 260° C., at a temperature ramp rate of less than 20° C./minute, preferably less than 10° C./minute and/or at a temperature ramp rate of less than 5° C./minute. Once the final target temperature is attained, the reaction is generally continued for a limited time at this temperature, before being terminated.

EXAMPLES

The following examples are illustrative of the practice of the present invention and are not intended in any way to limit their scope.

Copolymers from hydroquinone and 2-benzimidazolinone with 4,4'-difluorobenzophenone Comparative Example A: Preparation of PAEK Copolymer-A 12.5/87.5

In a 250 mL 3-neck reaction flask equipped with a mechanical stirrer, an argon inlet tube, a thermocouple plunging in the reaction medium, and a Dean-Stark trap with a condenser, were introduced 41.0 g of N-cyclohexyl-2-pyrrolidone (CHP), 3.70 g (33.60 mmol) of hydroquinone, 0.64 g (4.80 mmol) of 2-benzimidazolinone, 5.84 g (42.24 mmol) of anhydrous potassium carbonate, 8.46 g (38.79 mmol) of 4,4'-difluorobenzophenone and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 1 hour. During this process xylene along with water were distilled and collected in Dean-Stark trap and removed. The reaction mixture was heated from 175° C. to 280° C. in 30 minutes. During this process the reaction mixture changed from solution to viscous paste when temperature reached 240° C. With increase of temperature, the reaction mixture turned into liquid. The polymerization was kept at 280° C. for 3 hours. The reaction became viscous after 1 hour reaction, highly viscous after 2 hours reaction, and extremely viscous (climbing up the stirring rod) after 3 hours reaction. At end of 3 hours reaction, the reaction mixture was cooled to less than 100° C. under stirring. The reaction mixture solidified during the cooling process. 150 ml de-ionized water was added to the reaction mixture once temperature was less than 100° C. It was kept stirring until all solid was broken apart and solid precipitated, then mixture was then transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 10.8 g of a white powder. The structure of the obtained copolymer can be sketched, in terms of repeating units, as follows:

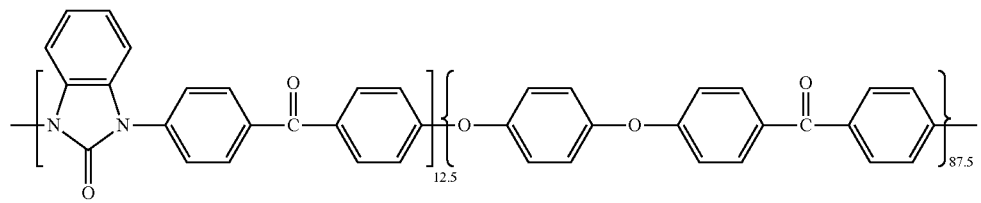

The inherent viscosity of the copolymer, measured at 0.5 wt/vol % in 96% $H_2SO_4$ at 30° C., as above detailed, was found to be 1.05 dL/g.

This copolymer has the same composition as disclosed in Example 23 of U.S. Pat. No. 8,609,801 with molar ratio (A:B) of 12.5:87.5. DSC analysis from first cooling scan from 340° C. to 50° C. at 20° C./minute did not show a crystallization temperature, second heating scan from 50° C. to 340° C. showed a $T_g$ of 166° C., a melting temperature $T_m$ of 293° C. with an enthalpy of melting endotherm of 1.9 J/g, indicating this copolymer is amorphous as defined in this application.

Figure 2:
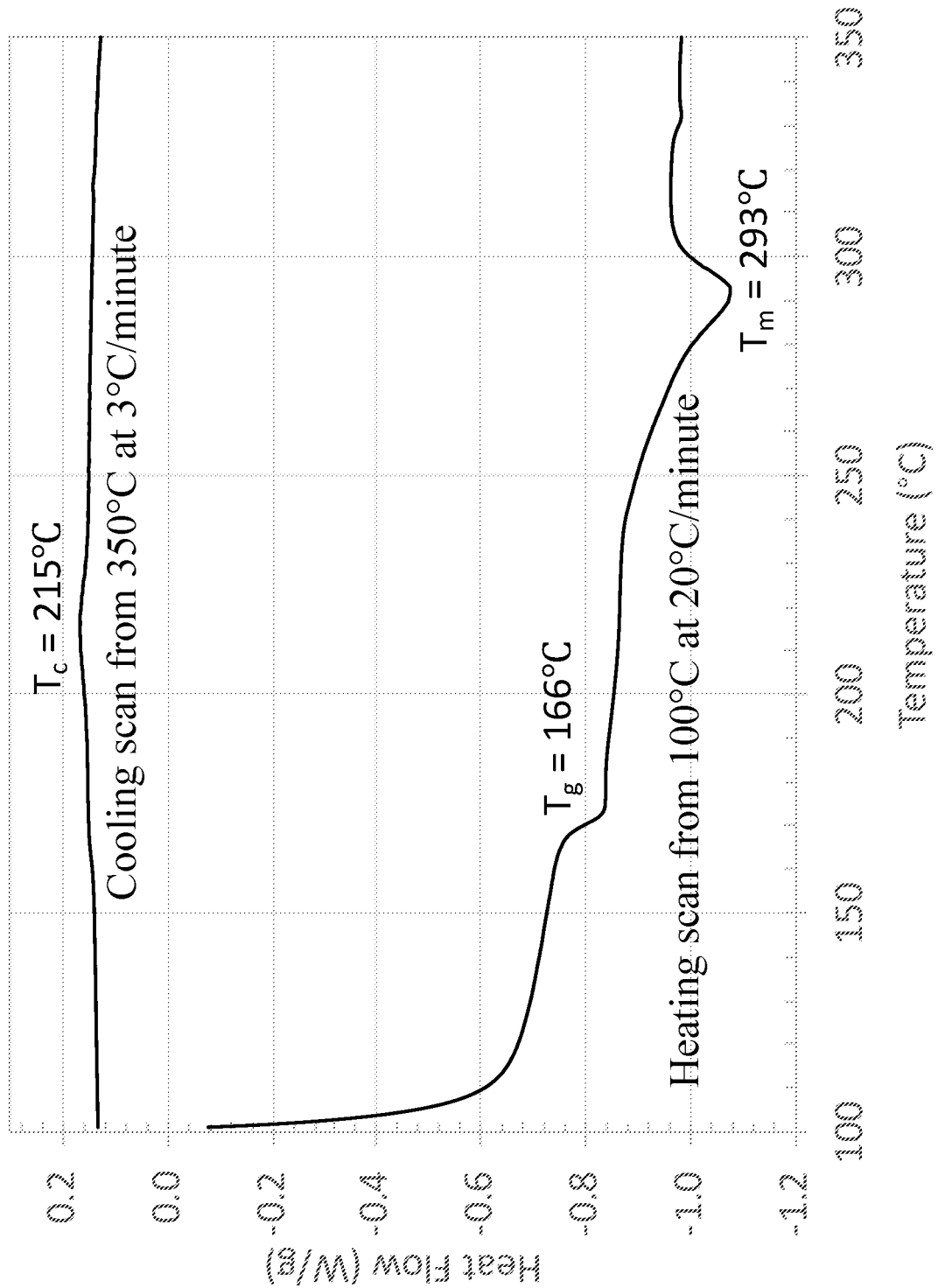
FIG. 2 is a graphical plot of DSC cooling scan curve (upper curve) at 3° C./minute and a heating scan curve (lower curve) at 20° C./minute for the PAEK copolymer of Comparative Example A. The cooling curve shows a minor crystallization exotherm peak. The heating curve shows a glass transition and a minor melting endotherm peak.

DSC analysis (FIG. 1) showed that this copolymer does not show a crystallization exotherm with cooling rate at 10° C./minute from 350° C. after melt, and reheating from 50° C. to 350° C. at 20° C./minute only showed a minor melting endotherm with a peak temperature of 293° C. and enthalpy of 4.2 J/g. This copolymer only showed a minor crystallization peak at 214.9° C. from DSC analysis (FIG. 2) when it was cooled at a slow rate of 3° C./minute from 350° C. after melt.

In amorphous form, the copolymer has poor chemical resistance and is not suitable for applications where the chemical resistance is important. To improve its chemical resistance, the copolymer either has to be cooled from melt at very low cooling rate (e.g., less than 3° C./minute) or annealed above 180° C. for extended period time to induce and form crystalline domain. The slow cooling to form crystalline domain from this copolymer will hinder its usefulness for fabrication of parts or articles via fast processing such as extrusion, injection molding and additive manufacturing or 3D printing. Annealing of parts and articles that are completely amorphous to induce formation of crystalline domain will cause significant dimensional change (shrinkage) and warpage. This will also hinder the usefulness of the copolymer in industrial applications.

Comparative Example B: Preparation of PAEK Copolymer-B 30/70

In a 250 mL 3-neck reaction flask equipped with a mechanical stirrer, an argon inlet tube, a thermocouple plunging in the reaction medium, and a Dean-Stark trap with a condenser, were introduced 55.0 g of N-cyclohexyl-2-pyrrolidone (CHP), 4.00 g (36.33 mmol) of hydroquinone, 2.09 g (15.67 mmol) of 2-benzimidazolinone, 7.89 g (57.09 mmol) of anhydrous potassium carbonate, 11.55 g (52.93 mmol) of 4,4'-difluorobenzophenone and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 1 hour. During this process xylene along with water were distilled and collected in Dean-Stark trap and removed. The reaction mixture was heated from 175° C. to 280° C. in 30 minutes. During this process the reaction mixture changed from a solution to a viscous paste when temperature reached 240° C. With increase of temperature, the reaction mixture turned into liquid. The polymerization was kept at 280° C. for 3 hours. The reaction became viscous after 1 hour reaction, highly viscous after 2 hours reaction, and extremely viscous (climbing up the stirring rod) after 3 hours reaction. At end of 3 hours reaction, the reaction mixture was cooled to less than 100° C. under stirring. The reaction mixture solidified during the cooling process. 150 ml de-ionized water was added to the reaction mixture once temperature was less than 100° C. It was kept stirring until all solid was broken apart and solid precipitated, the mixture was then transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 10.8 g of a white powder. The structure of the obtained copolymer can be sketched, in terms of repeating units, as follows:

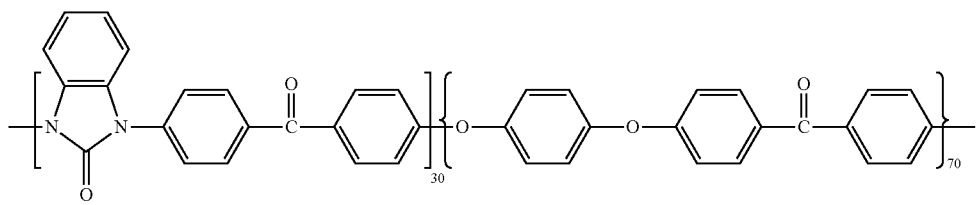

The inherent viscosity of the copolymer, measured at 0.5 wt/vol % in 96% $H_2SO_4$ at 30° C., as above detailed, was found to be 1.20 dL/g, DSC analysis from first cooling scan from 340° C. to 50° C. at 20° C./minute did not show a crystallization temperature, second heating scan from 50° C. to 340° C. only showed a $T_g$ of 190° C. with no detectable melting temperature, indicating that this copolymer is amorphous as defined in this application.

Comparative Example C: Preparation of PAEK Copolymer-C 20/80

In a 250 mL 3-neck reaction flask equipped with a mechanical stirrer, an argon inlet tube, a thermocouple plunging in the reaction medium, and a Dean-Stark trap with a condenser, were introduced 49.0 g of N-cyclohexyl-2-pyrrolidone (CHP), 4.00 g (36.33 mmol) of hydroquinone, 1.22 g (9.08 mmol) of 2-benzimidazolinone, 6.90 g (49.95 mmol) of anhydrous potassium carbonate, 10.11 g (46.32 mmol) of 4,4'-difluorobenzophenone and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 1 hour. During this process xylene along with water were distilled and collected in Dean-Stark trap and removed. The reaction mixture was heated from 175° C. to 280° C. in 30 minutes. During this process the reaction mixture changed from solution to viscous paste when temperature reached 240° C. With increase of temperature, the reaction mixture turned into liquid. The polymerization was kept at 280° C. for 3 hours. The reaction became viscous after 1 hour reaction, highly viscous after 2 hours reaction, and extremely viscous (climbing up the stirring rod) after 3 hours reaction. At end of 3 hours reaction, the reaction mixture was cooled to less than 100° C. under stirring. 150 ml de-ionized water was added to the reaction mixture once temperature was less than 100° C. It was kept stirring until all solid was broken apart and solid precipitated, then mixture was then transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid is less than 3. The filtered powder was then dried at 160° C. under vacuum for 12 hours yielding 12.8 g of a white powder. The structure of the obtained copolymer can be sketched, in terms of repeating units, as follows:

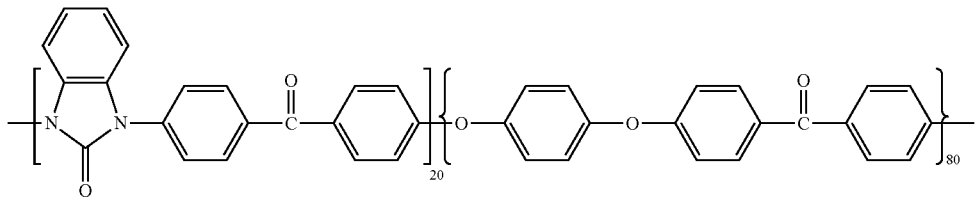

The inherent viscosity of the copolymer, measured at 0.5 wt/vol % in 96% $H_2SO_4$ at 30° C., as above detailed, was found to be 1.15 dL/g, DSC analysis from first cooling scan from 340° C. to 50° C. at 20° C./minute did not show a crystallization temperature, second heating scan from 50° C. to 340° C. showed a $T_g$ of 183° C. with no detectable melting temperature, indicating this copolymer is amorphous as defined in this application.

Comparative Example D: Preparation of PAEK Copolymer-D 10/90

In a 250 mL 3-neck reaction flask equipped with a mechanical stirrer, an argon inlet tube, a thermocouple plunging in the reaction medium, and a Dean-Stark trap with a condenser, were introduced 41.0 g of N-cyclohexyl-2-pyrrolidone (CHP), 4.00 g (36.33 mmol) of hydroquinone, 0.54 g (4.04 mmol) of 2-benzimidazolinone, 6.14 g (44.40 mmol) of anhydrous potassium carbonate, 8.98 g (41.17 mmol) of 4,4'-difluorobenzophenone and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 1 hour. During this process xylene along with water were distilled and collected in Dean-Stark trap and removed. The reaction mixture was heated from 175° C. to 280° C. in 30 minutes. During this process the reaction mixture remained as light brown color liquid. The polymerization was kept at 280° C. for 30 minutes. At 18 minutes, the reaction mixture became viscous. After 30 minutes reaction, the reaction mixture became highly viscous (climbing up the stirring rod), and the reaction mixture was cooled to less than 100° C. under stirring. The reaction mixture solidified during the cooling process. 150 ml de-ionized water was added to the reaction mixture once temperature was less than 100° C. The solid was broken into pieces and the mixture was transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 10.6 g of a white powder. The structure of the obtained copolymer can be sketched, in terms of repeating units, as follows:

plunging in the reaction medium, and a Dean-Stark trap with a condenser, were introduced 41.0 g of N-cyclohexyl-2-pyrrolidone (CHP), 3.85 g (34.97 mmol) of hydroquinone, 0.38 g (2.83 mmol) of 2-benzimidazolinone, 5.75 g (41.58 mmol) of anhydrous potassium carbonate, 8.41 g (38.55 mmol) of 4,4'-difluorobenzophenone and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 1 hour. During this process xylene along with water were distilled and collected in Dean-Stark trap and removed. The reaction mixture was heated from 175° C. to 280° C. in 30 minutes. During this process the reaction mixture changed from solution to slurry when temperature reached 240° C. With increase of temperature, the reaction mixture turned into liquid. The polymerization was kept at 280° C. for 3 hours. The reaction became viscous after 1 hour reaction, highly viscous after 2 hours reaction, and extremely viscous (climbing up the stirring rod) after 3 hours reaction. At end of 3 hours reaction, the reaction mixture was cooled to less than 100° C. under stirring. The reaction mixture solidified during the cooling process. 150 ml de-ionized water was added to the reaction mixture once temperature was less than 100° C. The solid was broken into pieces and the mixture was transferred to a Waring blender. It was mixed for 3 minutes and filtered. The filtered liquid was collected for

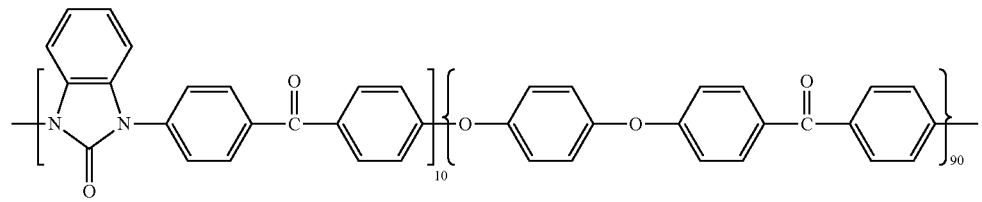

Figure 3:
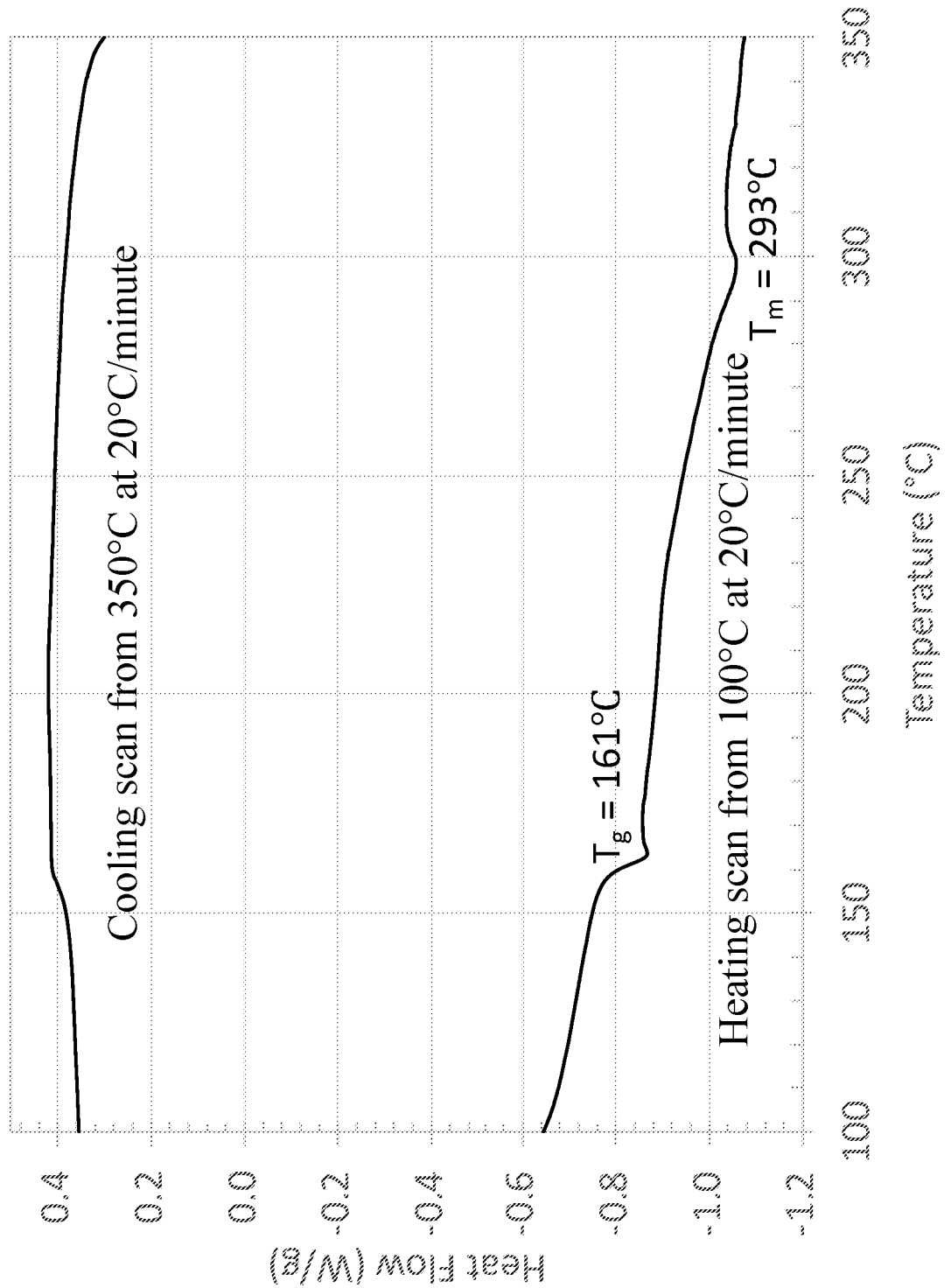
FIG. 3 is a graphical plot of DSC cooling scan curve (upper curve) at 20° C./minute and a heating scan curve (lower curve) at 20° C./minute for the PAEK copolymer of Comparative Example D. The cooling curve does not show crystallization exotherm peak. The heating curve shows a glass transition and a minor melting endotherm peak.
Figure 4:
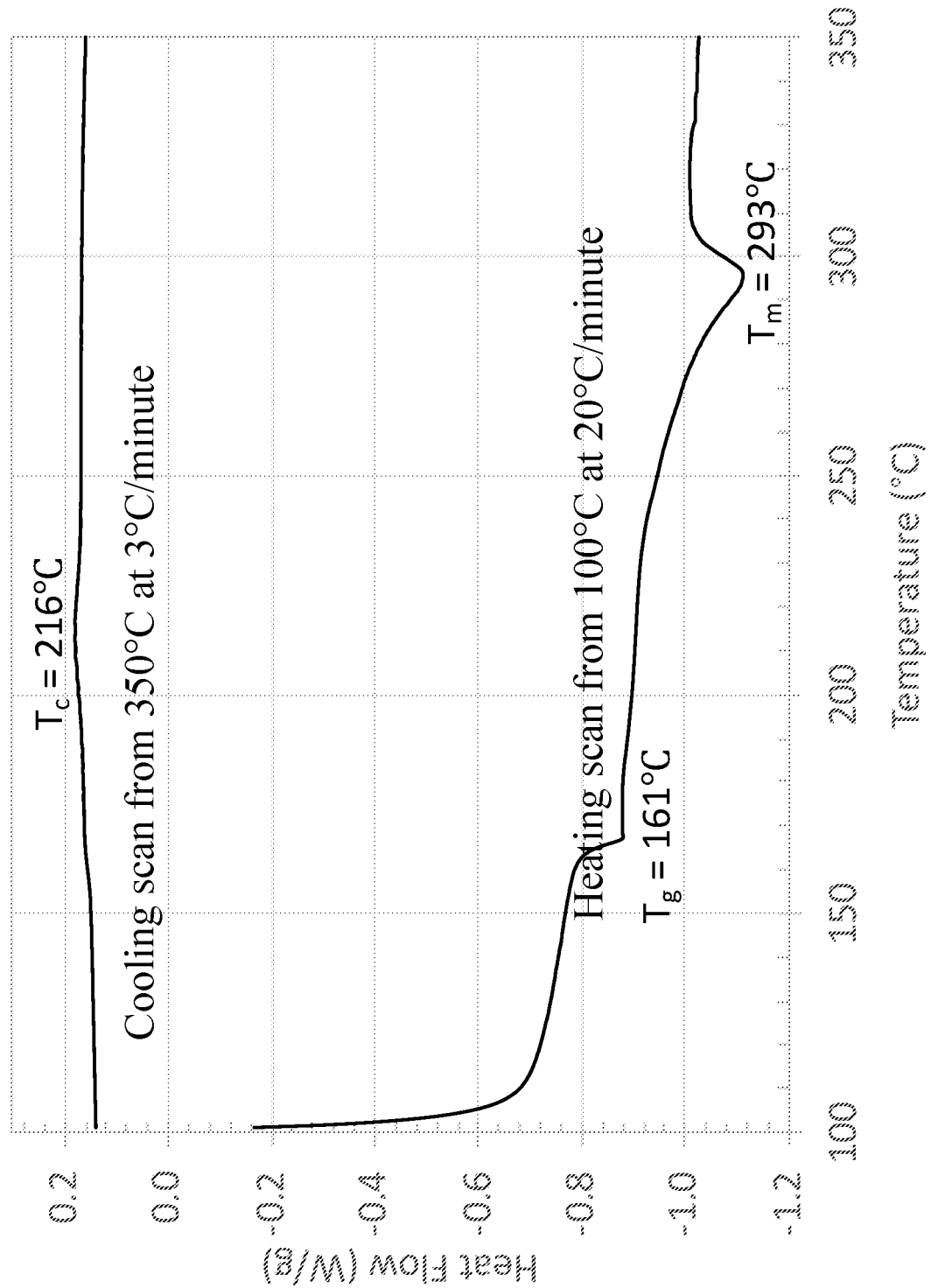
FIG. 4 is a graphical plot of DSC cooling scan curve (upper curve) at 3° C./minute and a heating scan curve (lower curve) at 20° C./minute for the PAEK copolymer of Comparative Example D. The cooling curve shows a minor crystallization exotherm peak. The heating curve shows a glass transition and a minor melting endotherm peak.

The inherent viscosity of the copolymer, measured at 0.5 wt/vol % in 96% $H_2SO_4$ at 30° C., as above detailed, was found to be 1.10 dL/g. DSC analysis (FIG. 3) from first cooling scan from 340° C. to 50° C. at 20° C./minute showed a crystallization temperature of 207° C. with enthalpy of crystallization exotherm of 1.5 J/g, second heating scan from 50° C. to 340° C. showed a $T_g$ of 161° C., a melting temperature $T_m$ of 293° C. with a enthalpy of melting endotherm of 4.4 J/g, indicating that this copolymer is amorphous as defined in this application. DSC analysis (FIG. 4) showed that slow cooling at 3° C./minute from melt can induce crystallization but the cooling is too slow to make this copolymer having practical usage in fabrication of components that require chemical resistance and dimensional stability.

Example 1: Preparation of PAEK-1 Copolymer 7.5/92.5

In a 250 mL 3-neck reaction flask equipped with a mechanical stirrer, an argon inlet tube, a thermocouple solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 10.5 g of a white powder. The structure of the obtained copolymer can be sketched, in terms of repeating units, as follows:

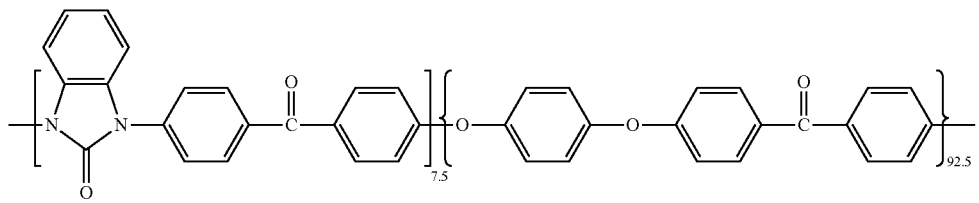

Figure 5:
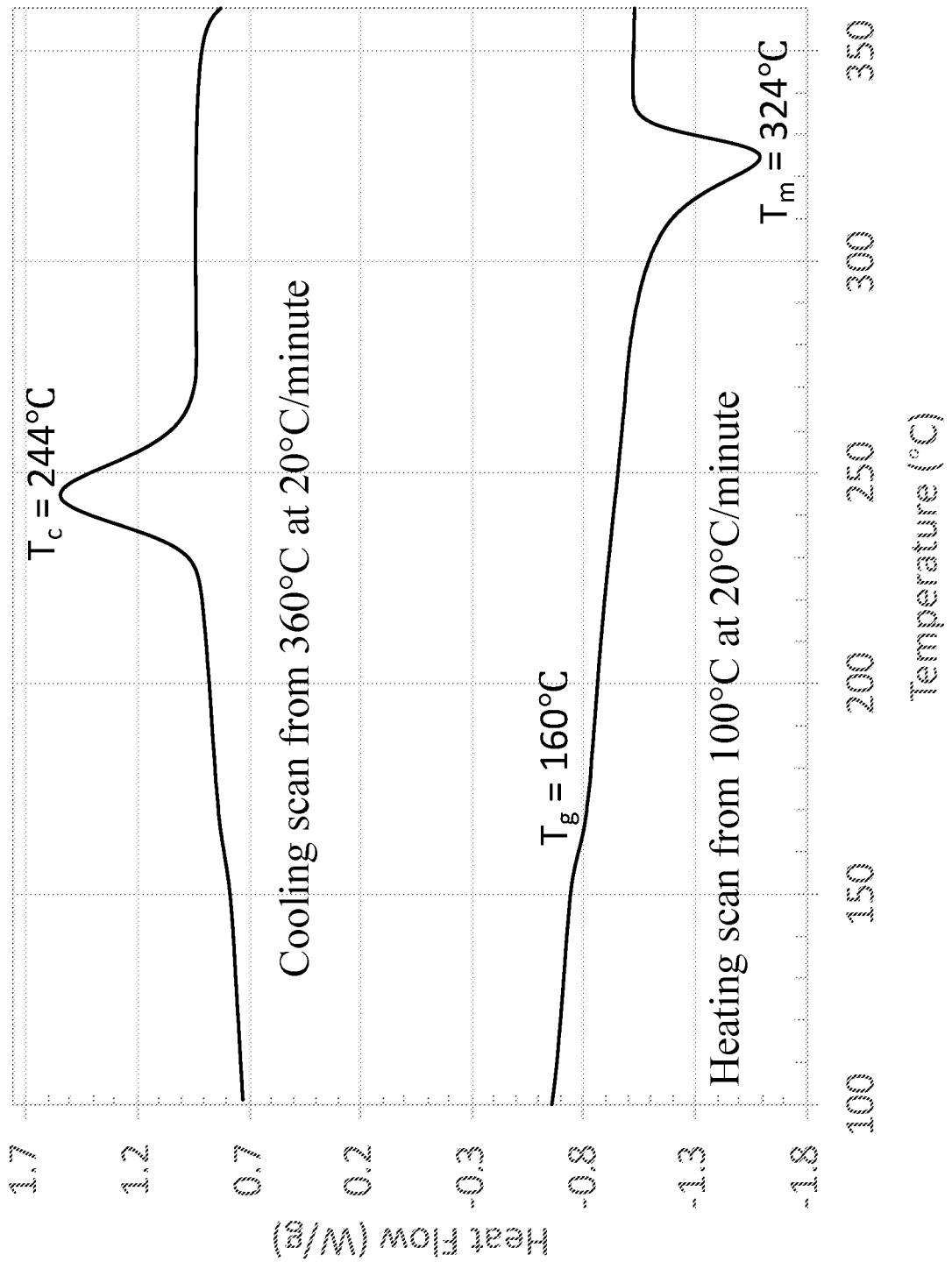
FIG. 5 is a graphical plot of DSC cooling scan curve (upper curve) at 20° C./minute and a heating scan curve (lower curve) at 20° C./minute for the PAEK copolymer of Example 1. The cooling curve shows a strong crystallization exotherm peak. The heating curve shows a glass transition and a strong melting endotherm peak.

The inherent viscosity of the copolymer, measured at 0.5 wt/vol % in 96% H₂SO₄ at 30° C., as above detailed, was found to be 1.15 dL/g. DSC analysis (FIG. 5) from first cooling scan from 340° C. to 50° C. at 20° C./minute surprisingly showed a crystallization temperature of 244° C. with enthalpy of crystallization exotherm of 35.0 J/g, second heating scan from 50° C. to 340° C. showed a $T_g$ of 160° C., a melting temperature $T_m$ of 324° C. with a enthalpy of melting endotherm of 32.9 J/g, indicating that this copolymer is semicrystalline as defined in this application.

Example 2: Preparation of PAEK-2 Copolymer 5.0/95.0

In a 250 mL 3-neck reaction flask equipped with a mechanical stirrer, an argon inlet tube, a thermocouple plunging in the reaction medium, and a Dean-Stark trap with a condenser, were introduced 41.0 g of N-cyclohexyl-2-pyrrolidone (CHP), 4.00 g (36.33 mmol) of hydroquinone, 0.26 g (1.91 mmol) of 2-benzimidazolinone, 5.81 g (42.06 mmol) of anhydrous potassium carbonate, 8.51 g (39.00 mmol) of 4,4'-difluorobenzophenone and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 1 hour. During this process xylene along with water were distilled and collected in Dean-Stark trap and removed. The reaction mixture was heated from 175° C. to 280° C. in 30 minutes. During this process the reaction mixture changed from solution to slurry when temperature reached 240° C. With increase of temperature, the reaction mixture turned into liquid. The polymerization was kept at 280° C. for 3 hours. The reaction became viscous after 1 hour reaction, highly viscous after 2 hours reaction, and extremely viscous (climbing up the stirring rod) after 2 hours and 45 minutes reaction. At end of 2 hours and 45 minutes reaction, the reaction mixture was cooled to less than 100° C. under stirring. The reaction mixture solidified during the cooling process. 150 ml de-ionized water was added to the reaction mixture once temperature was less than 100° C. The solid was broken into pieces and the mixture was transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 10.3 g of a white powder. The structure of the obtained copolymer can be sketched, in terms of repeating units, as follows:

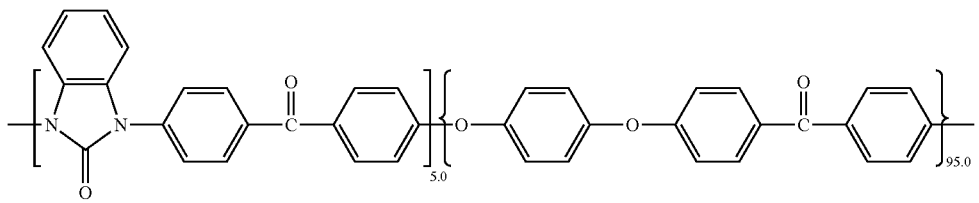

The inherent viscosity of the copolymer, measured at 0.5 wt/vol % in 96% H₂SO₄ at 30° C., as above detailed, was found to be 1.05 dL/g. DSC analysis from first cooling scan from 340° C. to 50° C. at 20° C./minute showed a crystallization temperature of 257° C. with enthalpy of crystallization exotherm of 24.0 J/g, second heating scan from 50° C. to 340° C. showed a $T_g$ of 161° C., a melting temperature $T_m$ of 317° C. with a enthalpy of melting endotherm of 26.0 J/g, indicating that this copolymer is semicrystalline as defined in this application.

Example 3: Preparation of PAEK-3 Copolymer 2.5/97.5

In a 250 mL 3-neck reaction flask equipped with a mechanical stirrer, an argon inlet tube, a thermocouple plunging in the reaction medium, and a Dean-Stark trap with a condenser, were introduced 41.0 g of N-cyclohexyl-2-pyrrolidone (CHP), 4.00 g (36.33 mmol) of hydroquinone, 0.12 g (0.93 mmol) of 2-benzimidazolinone, 5.66 g (40.98 mmol) of anhydrous potassium carbonate, 8.29 g (38.00 mmol) of 4,4'-difluorobenzophenone and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 1 hour. During this process xylene along with water were distilled and collected in Dean-Stark trap and removed. The reaction mixture was heated from 175° C. to 280° C. in 30 minutes. During this process the reaction mixture remained as gray color opaque liquid. The polymerization was kept at 280° C. for 3 hours. The reaction became viscous after 2 hours reaction. At end of 3 hours reaction, the reaction mixture was cooled to less than 100° C. under stirring. The reaction mixture solidified during the cooling process. 150 ml de-ionized water was added to the reaction mixture once temperature was less than 100° C. The solid was broken into pieces and the mixture was transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then removed from the reactor and dried at 160° C. under vacuum for 12 hours yielding 10.4 g of a white powder. The structure of the obtained copolymer can be sketched, in terms of repeating units, as follows:

Example 4: Preparation of PAEK-4 Copolymer 9.0/91.0

In a 250 mL 3-neck reaction flask equipped with a mechanical stirrer, an argon inlet tube a thermocouple plunging in the reaction medium, and a Dean-Stark trap with a condenser, were introduced 41.0 g of N-Cyclohexyl-2-pyrrolidone (CHP), 4.00 g (36.33 mmol) of hydroquinone, 0.48 g (3.59 mmol) of 2-Benzimidazolinone, 6.07 g (43.91 mmol) of anhydrous potassium carbonate, 8.88 g (40.72 mmol) of 4,4'-difluorobenzophenone and 20 ml xylene. The flask content was evacuated under vacuum and then filled with high purity argon. The reaction mixture was then placed under a constant argon purge (40 mL/min). The reaction mixture was heated slowly to 155° C. and kept at 155° C. for 30 minutes. The reaction mixture was then heated to 175° C. and kept 175° C. for 1 hour. During this process xylene along with water were distilled and collected in Dean-Stark trap and removed. The reaction mixture was heated from 175° C. to 280° C. in 30 minutes. During this process the reaction mixture became low viscosity liquid. The polymerization was kept at 280° C. for 55 minutes. At 40 minutes, the reaction mixture became viscous, and at 55 minutes the reaction mixture became highly viscous (climbing up the stirring rod). After 55 minutes reaction, the reaction mixture was cooled to less than 100° C. under stirring. The reaction mixture solidified during the cooling process. 150 ml de-ionized water was added to the reaction mixture once temperature was less than 100° C. The solid was broken into pieces and the mixture was transferred to a Waring blender. It was mixed for 3 minutes and filtered. The filtered liquid was collected for solvent recovery. The filtered solid was blended with another 75 ml de-ionized water for 3 minutes in a Waring blender to recover any residual solvent. The filtered liquid was combined with previous filtered liquid for solvent recovery.

Filtered solid was transferred to Waring blender along with 300 ml de-ionized water. It was blended for 3 minutes and filtered. The ion conductivity of filtered liquid was tested, and the process was repeated until the ion conductivity of the filtered liquid was less than 10. The solid was

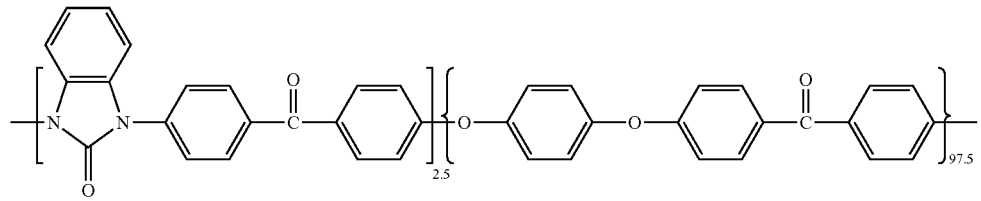

Figure 6:
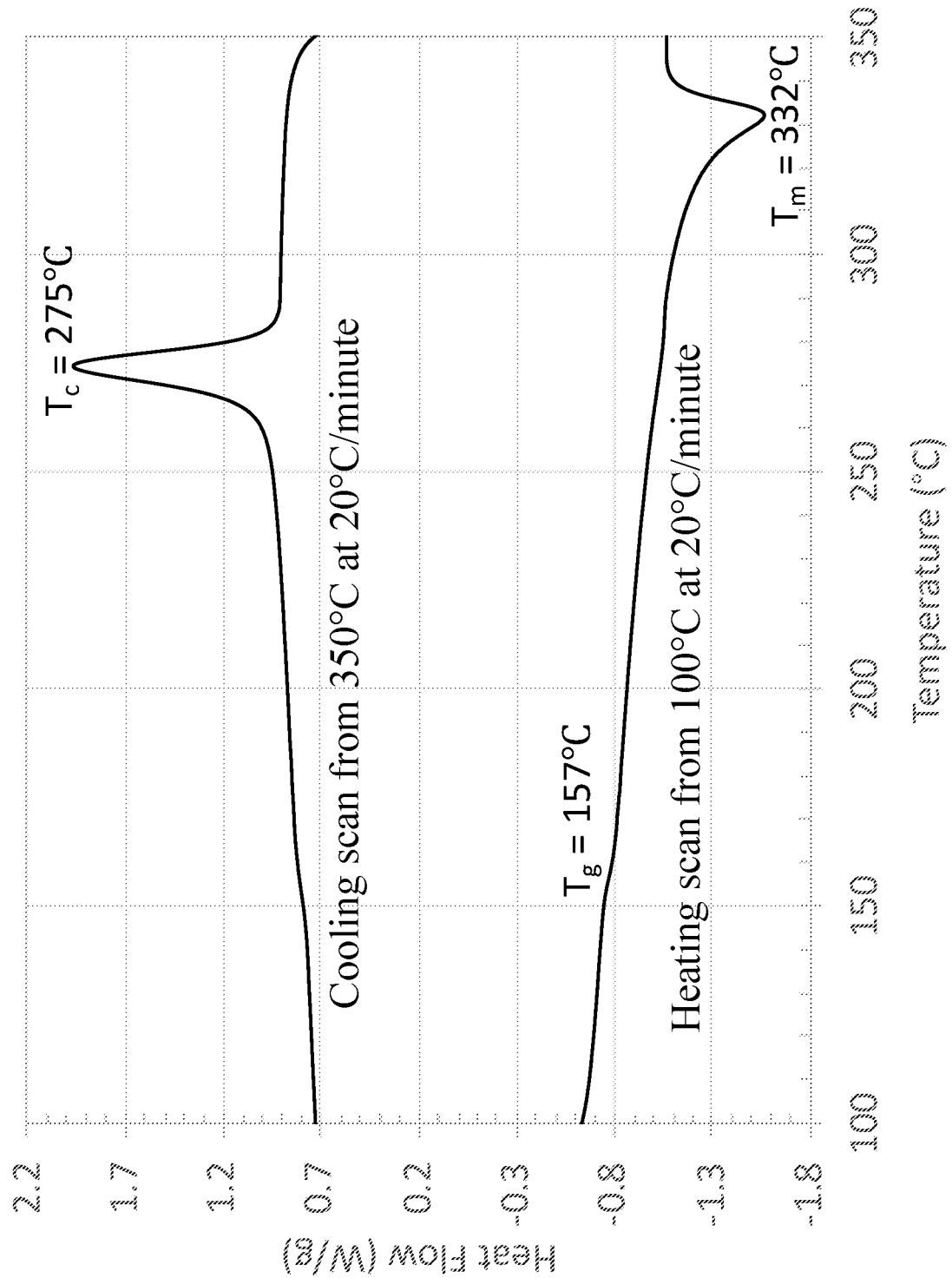
FIG. 6 is a graphical plot of DSC cooling scan curve (upper curve) at 20° C./minute and a heating scan curve (lower curve) at 20° C./minute for the PAEK copolymer of Example 3. The cooling curve shows a strong crystallization exotherm peak. The heating curve shows a glass transition and a strong melting endotherm peak.

The inherent viscosity of the copolymer, measured at 0.5 wt/vol % in 96% H$_2$SO$_4$ at 30° C., as above detailed, was found to be 1.10 dL/g. DSC analysis (FIG. 6) from first cooling scan from 360° C. to 50° C. at 20° C./minute showed a crystallization temperature of 275° C. with enthalpy of crystallization exotherm of 31.1 J/g, second heating scan from 50° C. to 350° C. showed a T$_g$ of 157° C., a melting temperature T$_m$ of 332° C. with a enthalpy of melting endotherm of 26.2 J/g, indicating that this copolymer is semicrystalline as defined in this application.

then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then removed from the reactor and dried at 160° C. under vacuum for 12 hours yielding 10.9 g of a white powder. The structure of the obtained copolymer can be sketched, in terms of repeating units, as follows:

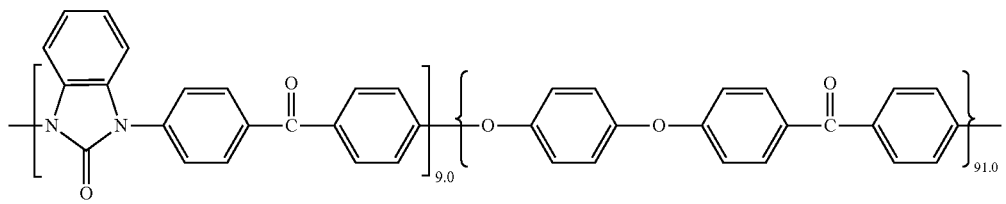

Figure 7:
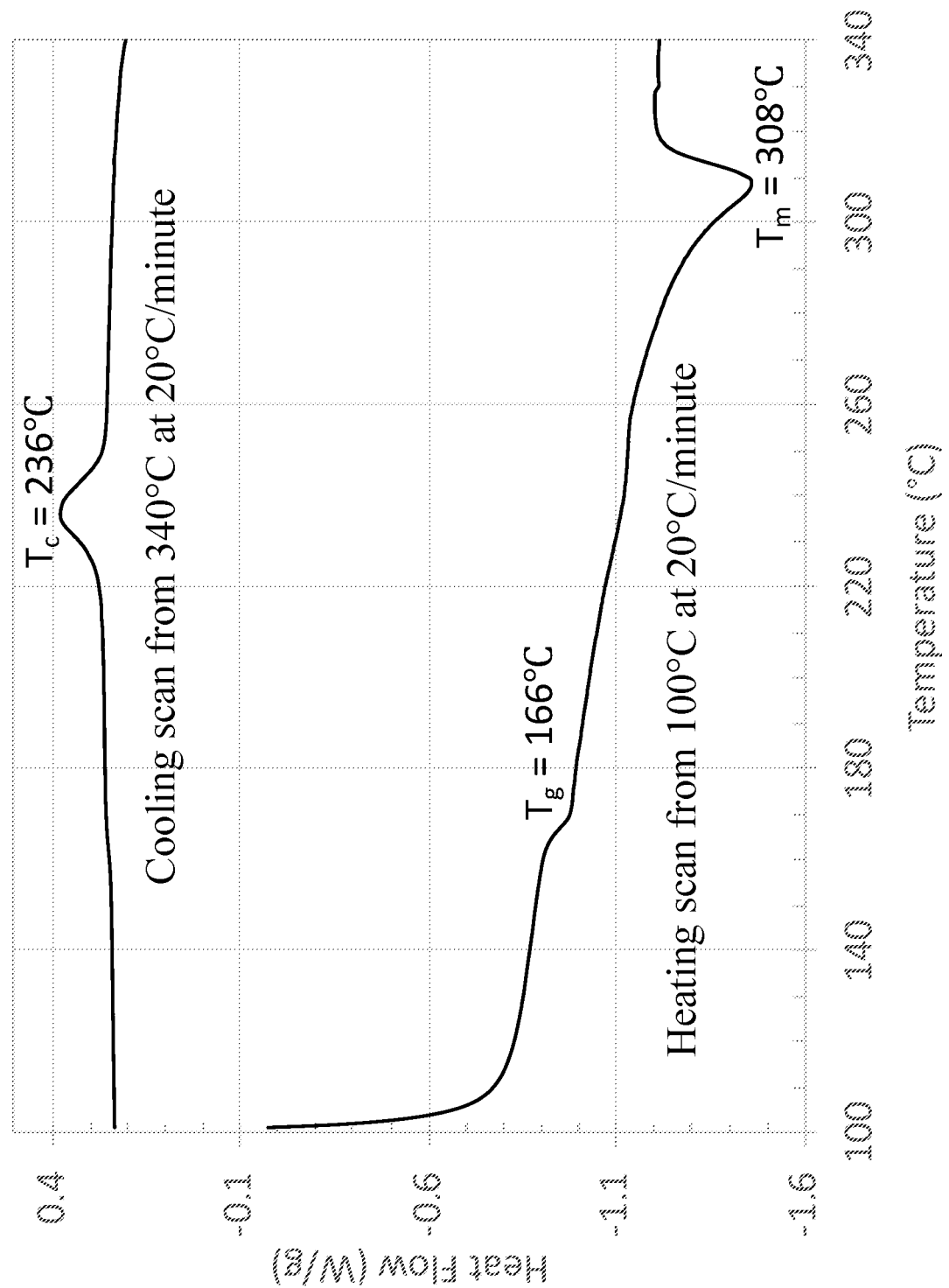
FIG. 7 is a graphical plot of DSC cooling scan curve (upper curve) at 20° C./minute and a heating scan curve (lower curve) at 20° C./minute for the PAEK copolymer of Example 4. The cooling curve shows a strong crystallization exotherm peak. The heating curve shows a glass transition and a strong melting endotherm peak.

The inherent viscosity of the copolymer, measured at 0.5 wt/vol % in 96% $H_2SO_4$ at 30° C., as above detailed, was found to be 1.04 dL/g. DSC analysis (FIG. 7) from first cooling scan from 340° C. to 50° C. at 20° C./minute unexpectedly showed a crystallization temperature of 236° C. with enthalpy of crystallization exotherm of 23.0 J/g, second heating scan from 50° C. to 340° C. showed a $T_g$ of 166° C., a melting temperature $T_m$ of 308° C. with a enthalpy of melting endotherm of 19.5 J/g, indicating that this copolymer is semicrystalline as defined in this application.

Example 5: Preparation of PAEK-5 Copolymer 7.5/92.5

In a 250 mL 3-neck reaction flask equipped with a mechanical stirrer, an argon inlet tube, a thermocouple plunging in the reaction medium, and a Dean-Stark trap with a condenser, were introduced 41.0 g of N-cyclohexyl-2-pyrrolidone (CHP), 4.00 g (36.33 mmol) of hydroquinone, 0.40 g (2.95 mmol) of 2-benzimidazolinone, 5.97 g (43.20 mmol) of anhydrous potassium carbonate, 8.74 g (40.06 mmol) of 4,4'-difluorobenzophenone and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 1 hour. During this process xylene along with water were distilled and collected in Dean-Stark trap and removed. The reaction mixture was heated from 175° C. to 240° C. in 30 minutes. During this process the reaction mixture changed from solution to slurry when temperature reached 240° C. The polymerization was kept at 240° C. for 6.5 hours. The reaction became viscous after 6.5 hours reaction, and the reaction mixture was cooled to less than 100° C. under stirring. The reaction mixture solidified during the cooling process. 150 ml of de-ionized water was added to the reaction mixture once temperature was less than 100° C. The solid was broken into pieces and the mixture was transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 10.4 g of a white powder. The structure of the obtained copolymer can be sketched, in terms of repeating units, as follows:

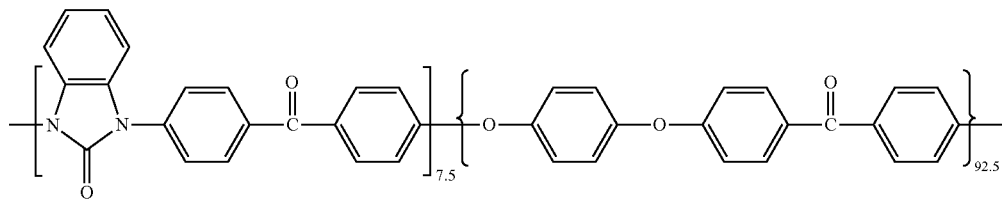

The inherent viscosity of the copolymer, measured at 0.5 wt/vol % in 96% $H_2SO_4$ at 30° C., as above detailed, was found to be 0.95 dL/g. DSC analysis from first cooling scan from 360° C. to 50° C. at 20° C./minute showed a crystallization temperature of 241° C. with enthalpy of crystallization exotherm of 34.0 J/g, second heating scan from 50° C. to 360° C. showed a $T_g$ of 164° C., a melting temperature $T_m$ of 324° C. with a enthalpy of melting endotherm of 35.0 J/g, indicating this copolymer is semicrystalline as defined in this application.

Example 6: Preparation of PAEK-6 Copolymer 7.5/92.5

In a 250 mL 3-neck reaction flask equipped with a mechanical stirrer, an argon inlet tube, a thermocouple plunging in the reaction medium, and a Dean-Stark trap with a condenser, were introduced 41.0 g of N-cyclohexyl-2-pyrrolidone (CHP), 3.85 g (34.97 mmol) of hydroquinone, 0.38 g (2.83 mmol) of 2-benzimidazolinone, 5.75 g (41.58 mmol) of anhydrous potassium carbonate and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 1 hour. During this process xylene along with water were distilled and collected in Dean-Stark trap and removed. The reaction mixture was then cooled to 155° C. and 8.41 g (38.55 mmol) of 4,4'-difluorobenzophenone was added. The reaction mixture was heated from 155° C. to 240° C. in 30 minutes. During this process the reaction mixture remained as light brown color liquid. The polymerization was kept at 240° C. for 6.5 hours, and reaction mixture gradually changed into viscous solution in gray color. At end of 6.5 hours reaction, the reaction mixture was cooled to less than 100° C. under stirring. The reaction mixture solidified during the cooling process. 150 ml of de-ionized water was added to the reaction mixture once temperature was less than 100° C. The solid was broken into pieces and the mixture was transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 10.6 g of a white powder. The structure of the obtained copolymer can be sketched, in terms of repeating units, as follows:

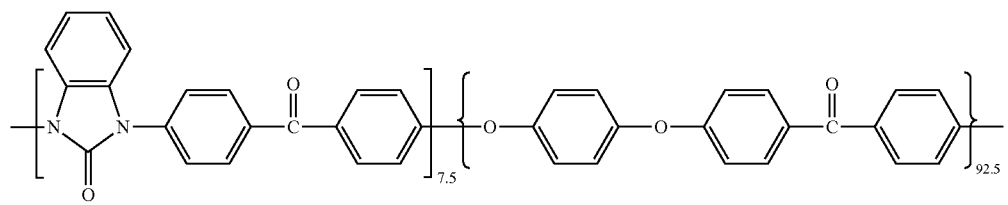

The inherent viscosity of the copolymer, measured at 0.5 wt/vol % in 96% $H_2SO_4$ at 30° C., as above detailed, was found to be 1.10 dL/g. DSC analysis from first cooling scan from 350° C. to 50° C. at 20° C./minute showed a crystallization temperature $T_c$ of 241° C. with enthalpy of crystallization exotherm of 28.0 J/g, second heating scan from 50° C. to 350° C. showed a $T_g$ of 163° C., a melting temperature $T_m$ of 317° C. with a enthalpy of melting endotherm of 29.0 J/g, indicating that this copolymer is semicrystalline as defined in this patent application.

Example 7: Preparation of PAEK-7 Copolymer 2.25/97.75

In a 250 mL 3-neck reaction flask equipped with a mechanical stirrer, an argon inlet tube, a thermocouple plunging in the reaction medium, and a Dean-Stark trap with a condenser, were introduced 41.0 g of N-cyclohexyl-2-pyrrolidone (CHP), 4.00 g (36.33 mmol) of hydroquinone, 0.11 g (0.84 mmol) of 2-benzimidazolinone, 5.65 g (40.88 mmol) of anhydrous potassium carbonate, 8.27 g (37.91 mmol) of 4,4'-difluorobenzophenone and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 1 hour. During this process xylene along with water were distilled and collected in Dean-Stark trap and removed. The reaction mixture was then heated from 155° C. to 240° C. in 30 minutes. During this process the reaction mixture changed into low viscosity slurry. After 2.5 hours reaction, the reaction mixture became viscous and the polymerization was kept at 240° C. for 7.5 hours. At end of 7.5 hours reaction, the reaction mixture was cooled to less than 100° C. under stirring. The reaction mixture solidified during the cooling process, and 150 ml de-ionized water was added to the reaction mixture once temperature was less than 100° C. The solid was broken into pieces and the mixture was transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 10.3 g of a white powder. The structure of the obtained copolymer can be sketched, in terms of repeating units, as follows:

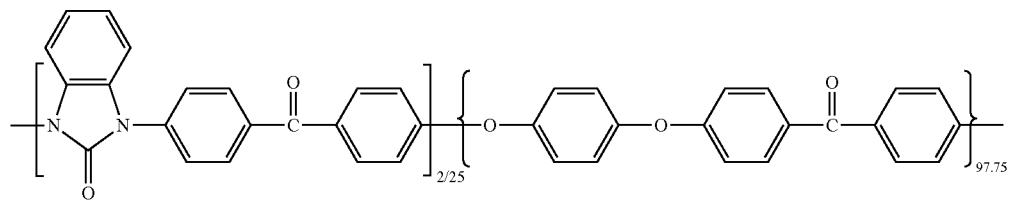

Figure 8:
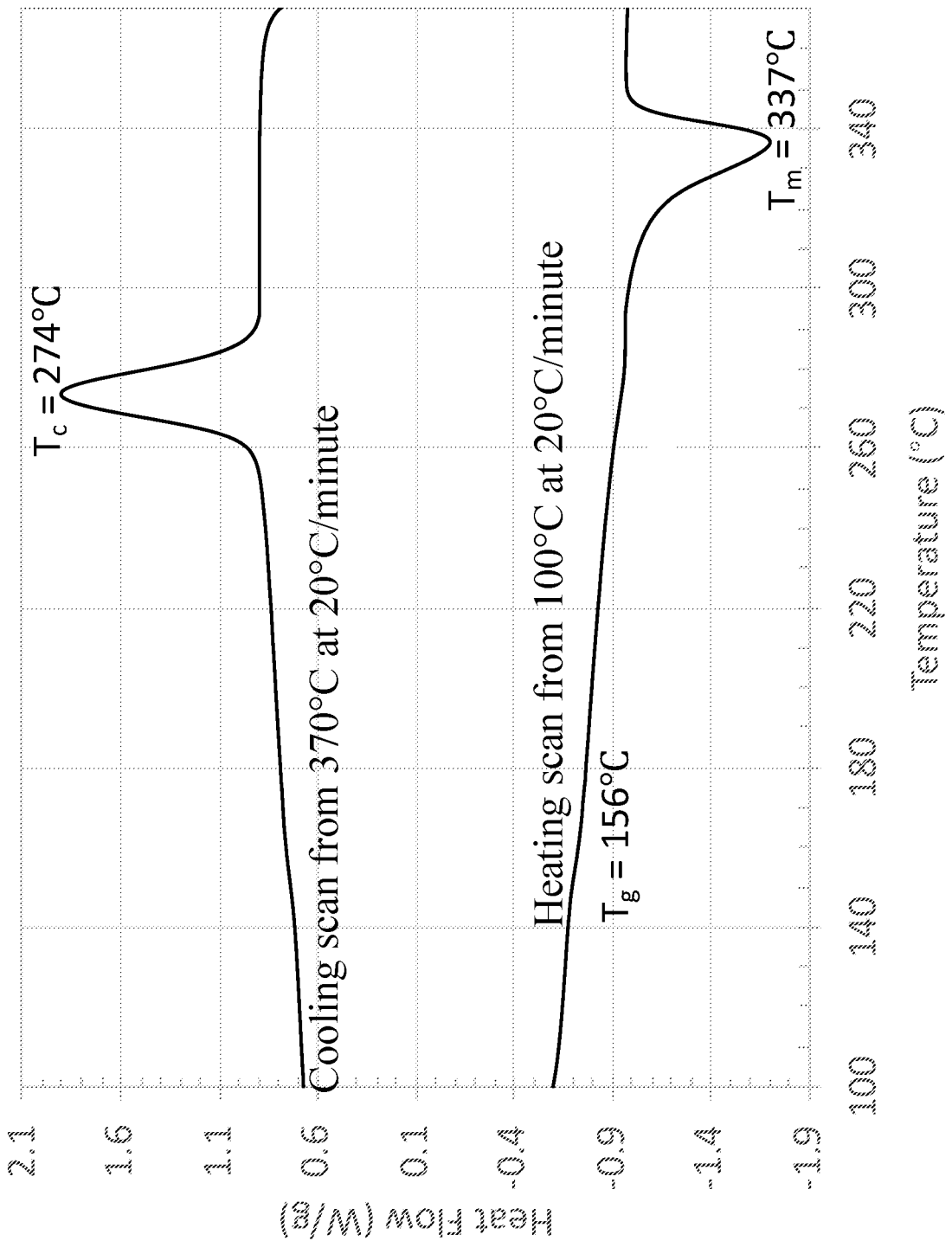
FIG. 8 is a graphical plot of DSC cooling scan curve (upper curve) at 20° C./minute and a heating scan curve (lower curve) at 20° C./minute for the PAEK copolymer of Example 7. The cooling curve shows a strong crystallization exotherm peak. The heating curve shows a glass transition and a strong melting endotherm peak.

The inherent viscosity of the copolymer, measured at 0.5 wt/vol % in 96% $H_2SO_4$ at 30° C., as above detailed, was found to be 0.90 dL/g. DSC analysis (FIG. 8) from first cooling scan from 380° C. to 50° C. at 20° C./minute showed a crystallization temperature $T_c$ of 274° C. with enthalpy of crystallization exotherm of 44.8 J/g, second heating scan from 50° C. to 380° C. showed a $T_g$ of 156° C., a melting temperature $T_m$ of 337° C. with a enthalpy of melting endotherm of 39.4 J/g, indicating that this copolymer is semicrystalline as defined in this patent application.

The properties of these copolymers from Example 1 to Example 7 are summarized in Table 1.

mmol) of 1,4-bis(4-fluorobenzoyl)benzene and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 1 hour. During this process xylene along with water were distilled and collected in Dean-Stark trap and removed. The reaction mixture was heated from 175° C. to 240° C. in 30 minutes. During this process the reaction mixture changed from solution to slurry when temperature reached 240° C. The polymerization was kept at 240° C. for 30 minutes. The reaction became viscous paste, and the reaction mixture was

TABLE 1

| Example | BI:HQ:DFB [a] | $T_g$ [b], ° C. | $T_c$ [c], ° C. | $\Delta H_c$ [d], J/g | $T_m$ [e], ° C. | $\Delta H_m$ [f], J/g | IV [g], dL/g |
|---|---|---|---|---|---|---|---|
| Comparable Example A | 12.5:87.5:101.0 | 166 | ND[h] | ND | 293 | 1.9 | 1.05 |
| Comparable Example B | 30.0:70.0:101.0 | 190 | ND | ND | ND | ND | 1.20 |
| Comparable Example C | 20.0:80.0:101.0 | 183 | ND | ND | ND | ND | 1.15 |
| Comparable Example D | 10.0:90.0:101.0 | 161 | 207 | 1.5 | 293 | 4.4 | 1.10 |
| Example 1 | 7.5:92.5:102.0 | 160 | 244 | 35.0 | 324 | 32.9 | 1.15 |
| Example 2 | 5.0:95.0:102.0 | 161 | 257 | 24.0 | 317 | 26.0 | 1.05 |
| Example 3 | 2.5:97.5:102.0 | 157 | 275 | 31.1 | 332 | 26.2 | 1.10 |
| Example 4 | 9.0:91.0:102.0 | 166 | 236 | 23.0 | 308 | 19.5 | 1.04 |
| Example 5 | 7.5:92.5:102.0 | 164 | 241 | 34.0 | 324 | 35.0 | 0.95 |
| Example-6 | 7.5:92.5:102.0 | 163 | 241 | 28.0 | 317 | 29.0 | 1.10 |
| Example-7 | 2.25:97.75:102.0 | 156 | 274 | 44.8 | 337 | 39.4 | 0.90 |

Wherein
[a] BI is abbreviation of 2-benzimidazolinone, HQ is abbreviation of hydroquinone, DFB is abbreviation of 4,4'-difluorobenzophenone;
[b] $T_g$ is the glass transition temperature from second heating scan;
[c] $T_c$ is the crystallization temperature from first cooling scan at cooling rate of 20° C./minute;
[d] $\Delta H_c$ is the enthalpy of crystallization exotherm peak;
[e] $T_m$ is the peak temperature of melting endotherm from second heating scan at 20° C./minute;
[f] $\Delta H_m$ is the enthalpy of the melting endotherm peak;
[g] IV is the inherent viscosity in 0.5 wt/v % in 96% sulfuric acid at 30° C.; and
[h] ND is not detected.

Copolymers from Hydroquinone and 2-Benzimidazolinone with 1,4-bis(4-fluorobenzoyl)benzene Example 8: Preparation of PAEK-8 Copolymer 10/90

In a 250 mL 3-neck reaction flask equipped with a mechanical stirrer, an argon inlet tube, a thermocouple plunging in the reaction medium, and a Dean-Stark trap with a condenser, were introduced 50.0 g of N-cyclohexyl-2-pyrrolidone (CHP), 3.60 g (32.69 mmol) of hydroquinone, 0.49 g (3.63 mmol) of 2-benzimidazolinone, 5.52 g (39.96 mmol) of anhydrous potassium carbonate, 11.83 g (36.69 heated to 270° C. over 15 minutes. The reaction was kept at 270° C. for 4.5 hours, and during this process the reaction mixture turned into viscous solution. After 4.5 hours reaction, the reaction mixture was cooled to less than 100° C. under stirring. The reaction mixture solidified during the cooling process. 150 ml of de-ionized water was added to the reaction mixture once temperature was less than 100° C. The solid was broken into pieces and the mixture was transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid is less than 3. The filtered powder was then dried at 160° C. under vacuum for 12 hours yielding 14.2 g of a white powder. The structure of the obtained copolymer can be sketched, in terms of repeating units, as follows:

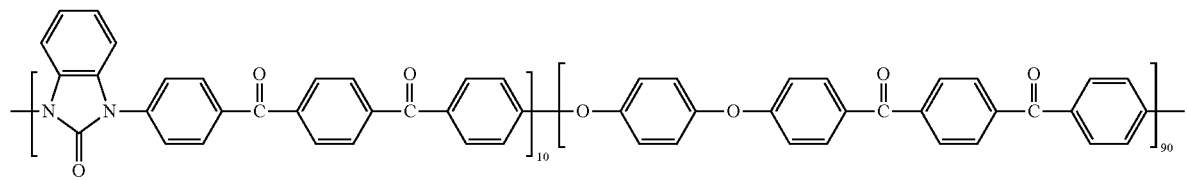

The inherent viscosity of the copolymer, measured at 0.5 wt/vol % in 96% $H_2SO_4$ at 30° C., as above detailed, was found to be 0.65 dL/g. DSC analysis from first cooling scan from 380° C. to 50° C. at 20° C./minute showed a crystallization temperature of 322° C. with enthalpy of crystallization exotherm of 36.0 J/g, second heating scan from 50° C. to 380° C. showed a $T_g$ of 172° C., a melting temperature $T_m$ of 355° C. with a enthalpy of melting endotherm of 29.0 J/g, indicating this copolymer is semicrystalline as defined in this application.

Example 9: Preparation of PAEK-9 Copolymer 12.5/87.5

In a 250 mL 3-neck reaction flask equipped with a mechanical stirrer, an argon inlet tube, a thermocouple plunging in the reaction medium, and a Dean-Stark trap with a condenser, were introduced 50.0 g of N-cyclohexyl-2-pyrrolidone (CHP), 0.54 g (4.02 mmol) of 2-benzimidazolinone, 0.61 g (4.42 mmol) of anhydrous potassium carbonate, 10.47 g (32.50 mmol) of 1,4-bis(4-fluorobenzoyl)benzene and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 1 hour. During this process xylene along with water were distilled and collected in Dean-Stark trap and removed. The reaction mixture was heated from 175° C. to 210° C. in 15 minutes. The reaction mixture was kept at 210° C. for 1 hr. It was then cooled to 155° C. 3.10 g (28.15 mmol) of hydroquinone and 4.28 g (28.44 mmol) of anhydrous potassium carbonate were added along with 20 ml xylene. The reaction mixture was kept at 155° C. for 30 minutes, and it was then heated to 175° C. and kept at 175° C. for 1.5 hours. During this process xylene along with water were distilled and collected in Dean-Stark trap and removed. The reaction mixture was then heated to 240° C. and kept at 240° C. for 15 minutes. During this process, the reaction mixture was low viscosity slurry. The reaction mixture was heated to 260° C. and kept at 260° C. for 30 minutes. The reaction mixture was then heated to 280° C. and kept at 280° C. for 1.5 hours. After 1.5 hours reaction at 280° C., the reaction mixture was cooled to less than 100° C. under stirring. The reaction mixture solidified during the cooling process. 150 ml of de-ionized water was added to the reaction mixture once temperature was less than 100° C. The solid was broken into pieces and the mixture was transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 12.4 g of a white powder. The structure of the obtained copolymer can be sketched, in terms of repeating units, as follows:

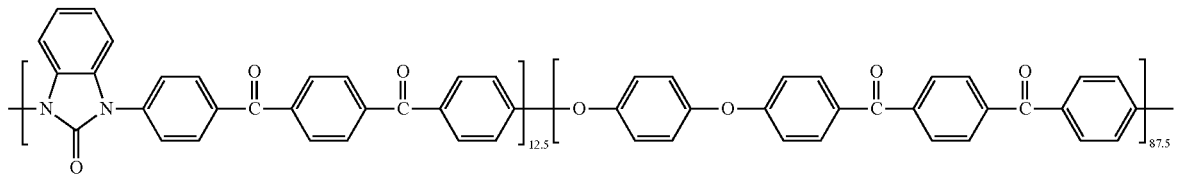

The inherent viscosity of the copolymer, measured at 0.5 wt/vol % in 96% $H_2SO_4$ at 30° C., as above detailed, was found to be 0.70 dL/g. DSC analysis from first cooling scan from 380° C. to 50° C. at 20° C./minute showed a crystallization temperature of 265° C. with enthalpy of crystallization exotherm of 36.0 J/g, second heating scan from 50° C. to 380° C. showed a $T_g$ of 176° C., a melting temperature $T_m$ of 343° C. with a enthalpy of melting endotherm of 35.0 J/g, indicating this copolymer is semicrystalline as defined in this application.

Example 10: Preparation of PAEK-10 Copolymer 20.0/80.0

In a 250 mL 3-neck reaction flask equipped with a mechanical stirrer, an argon inlet tube, a thermocouple plunging in the reaction medium, and a Dean-Stark trap with a condenser, were introduced 50.0 g of N-cyclohexyl-2-pyrrolidone (CHP), 0.96 g (7.15 mmol) of 2-benzimidazolinone, 1.09 g (7.87 mmol) of anhydrous potassium carbonate, 11.64 g (36.12 mmol) of 1,4-bis(4-fluorobenzoyl)benzene and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 1 hour. During this process xylene along with water were distilled and collected in Dean-Stark trap and removed. The reaction mixture was heated from 175° C. to 240° C. in 25 minutes. The reaction mixture was kept at 240° C. for 1 hr. It was then cooled to 155° C. 3.15 g (28.61 mmol) of hydroquinone and 4.35 g (31.49 mmol) of anhydrous potassium carbonate were added along with 20 ml xylene. The reaction mixture was kept at 155° C. for 30 minutes, and it was then heated to 175° C. and kept at 175° C. for 1.5 hours. During this process xylene along with water were distilled and collected in Dean-Stark trap and removed. The reaction mixture was then heated to 240° C. and kept at 240° C. for 30 minutes. During this process, the reaction mixture was low viscosity slurry. The reaction mixture was heated to 260° C. and kept at 260° C. for 3 hours. During this process, the reaction mixture became highly viscous solution. After 3 hours reaction at 260° C., the reaction mixture was cooled to less than 100° C. under stirring. The reaction mixture solidified during the cooling process. 150 ml of de-ionized water was added to the reaction mixture once temperature was less than 100° C. The solid was broken into pieces and the mixture was transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 13.9 g of a white powder. The structure of the obtained copolymer can be sketched, in terms of repeating units, as follows:

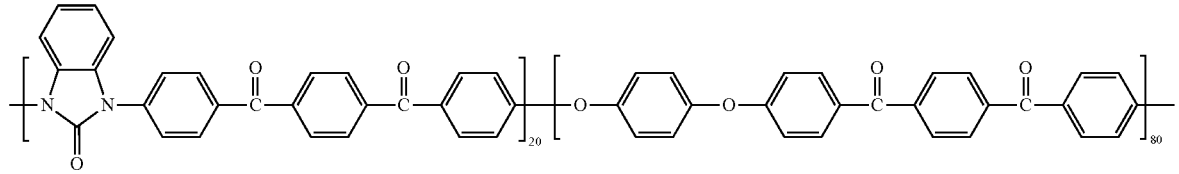

The inherent viscosity of the copolymer, measured at 0.5 wt/vol % in 96% $H_2SO_4$ at 30° C., as above detailed, was found to be 0.95 dL/g. DSC analysis from first cooling scan from 380° C. to 50° C. at 20° C./minute showed a crystallization temperature of 249° C. with enthalpy of crystallization exotherm of 22.0 J/g, second heating scan from 50° C. to 380° C. showed a $T_g$ of 183° C., a melting temperature $T_m$ of 331° C. with a enthalpy of melting endotherm of 23.0 J/g, indicating this copolymer is semicrystalline as defined in this application.

Example 11: Preparation of PAEK-11 Copolymer 15.0/85.0

In a 250 mL 3-neck reaction flask equipped with a mechanical stirrer, an argon inlet tube, a thermocouple plunging in the reaction medium, and a Dean-Stark trap with a condenser, were introduced 50.0 g of N-cyclohexyl-2-pyrrolidone (CHP), 0.72 g (5.39 mmol) of 2-benzimidazolinone, 0.82 g (5.92 mmol) of anhydrous potassium carbonate, 11.92 g (36.98 mmol) of 1,4-bis(4-fluorobenzoyl)benzene and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 1 hour. During this process xylene along with water were distilled and collected in Dean-Stark trap and removed. The reaction mixture was heated from 175° C. to 220° C. in 20 minutes. The reaction mixture was kept at 220° C. for 1 hour. It was then cooled to 155° C. 3.36 g (30.51 mmol) of hydroquinone and 4.64 g (33.57 mmol) of anhydrous potassium carbonate were added along with 20 ml xylene. The reaction mixture was kept at 155° C. for 30 minutes, and it was then heated to 175° C. and kept at 175° C. for 1.5 hours. During this process xylene along with water were distilled and collected in Dean-Stark trap and removed. The reaction mixture was then heated to 240° C. and kept at 240° C. for 1 hour. During this process, the reaction mixture was low viscosity slurry. The reaction mixture was heated to 260° C. and kept at 260° C. for 4 hours. During this process, the reaction mixture became highly viscous solution. After 4 hours reaction at 260° C., the reaction mixture was cooled to less than 100° C. under stirring. The reaction mixture solidified during the cooling process. 150 ml of de-ionized water was added to the reaction mixture once temperature was less than 100° C. The solid was broken into pieces and the mixture was transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 14.0 g of a white powder. The structure of the obtained copolymer can be sketched, in terms of repeating units, as follows:

PEEK and PEK), and high levels of crystallinity as compared to the Hay and other patent references. They may therefore be advantageously used in additive manufacturing, injection molding, extrusion, thermoforming, rotational molding and preparation of composites for load-bearing structural applications. Composite materials may be made as described in *Impregnation Techniques for Thermoplastic Matrix Composites*. A Miller and A G Gibson, *Polymer & Polymer Composites* 4(7), 459-481 (1996), *manufacture of high-performance fiber reinforced thermoplastics by aqueous powder impregnation*.

The invention is not restricted to the details of the foregoing embodiment(s). The invention extends to any novel one, or any novel combination, of the features disclosed in this specification (including any accompanying claims, abstract and drawings), or to any one specific embodiment, or any of several various possible combinations, of the steps of any method or process so disclosed.

The foregoing examples are merely illustrative of the invention, serving to illustrate only some of the features of the present invention. The appended claims are intended to claim the invention as broadly as it has been conceived and the examples herein presented are illustrative of selected

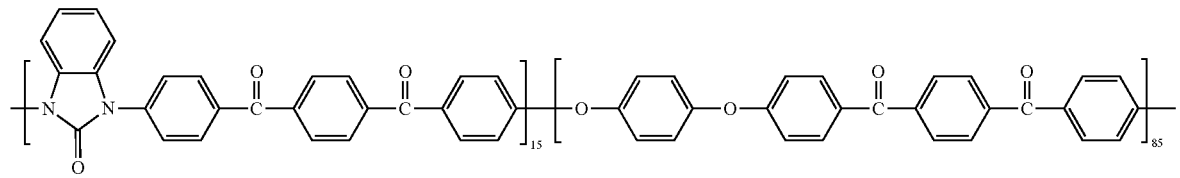

Figure 9:
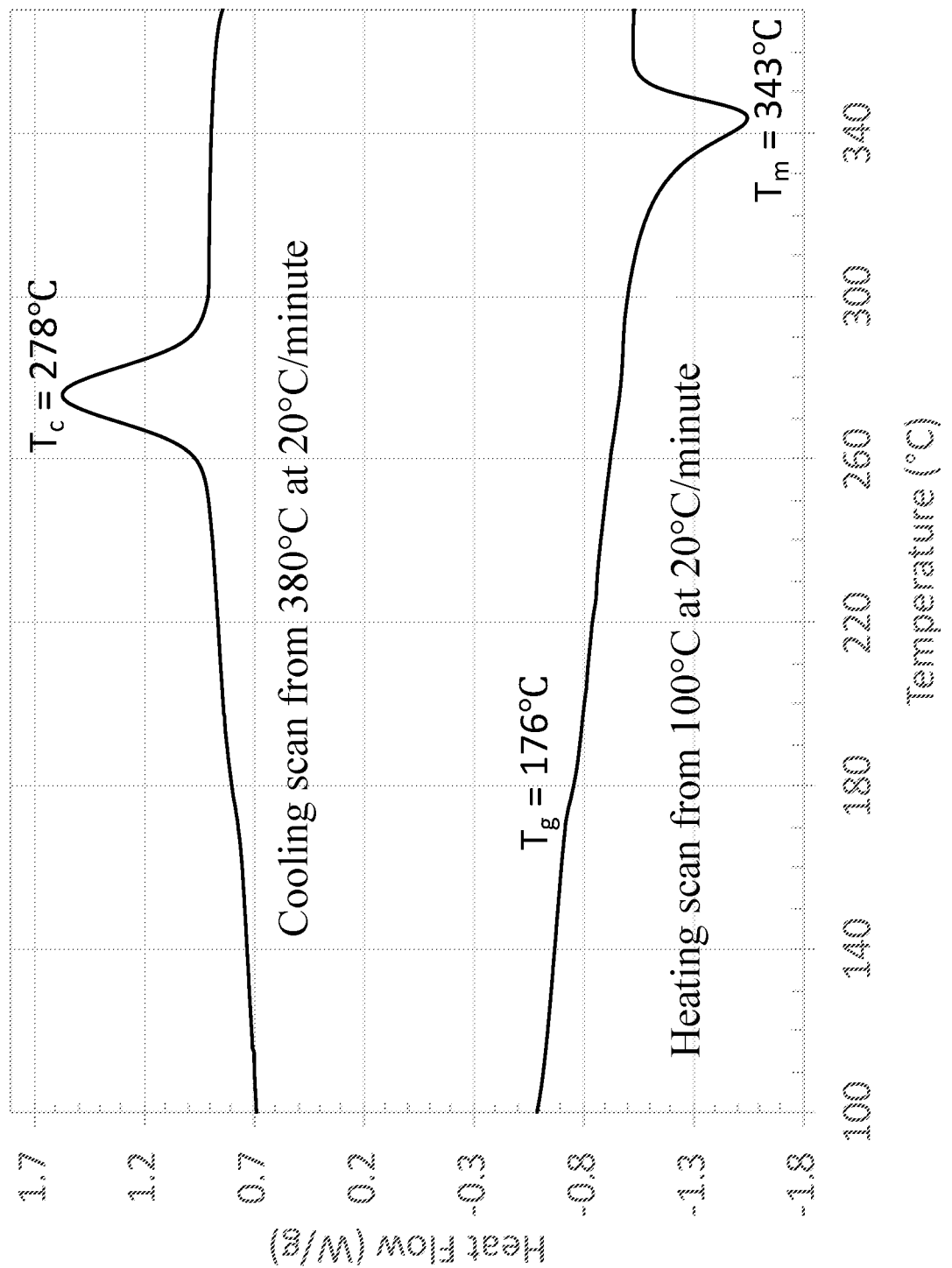
FIG. 9 is a graphical plot of DSC cooling scan curve (upper curve) at 20° C./minute and a heating scan curve (lower curve) at 20° C./minute for the PAEK copolymer of Example 11. The cooling curve shows a strong crystallization exotherm peak. The heating curve shows a glass transition and a strong melting endotherm peak.

The inherent viscosity of the copolymer, measured at 0.5 wt/vol % in 96% $H_2SO_4$ at 30° C., as above detailed, was found to be 0.93 dL/g. DSC analysis (FIG. 9) from first cooling scan from 380° C. to 50° C. at 20° C./minute showed a crystallization temperature of 278° C. with enthalpy of crystallization exotherm of 38.0 J/g, second heating scan from 50° C. to 380° C. showed a $T_g$ of 176° C., a melting temperature $T_m$ of 343° C. with a enthalpy of melting endotherm of 33.0 J/g, indicating this copolymer is semicrystalline as defined in this application.

The properties of these copolymers from Example 8 to Example 11 are summarized in Table 2.

embodiments from a manifold of all possible embodiments, suggesting or implying other embodiments of the chemistry described herein. Accordingly it is Applicant's intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of". Where necessary, ranges have been supplied, those ranges are inclusive of all sub-ranges there between. Such ranges may be viewed as a Markush group or

TABLE 2

| Example | BI:HQ:BFBB [a] | $T_g$ [b], ° C. | $T_c$ [c], ° C. | $\Delta H_c$ [d], J/g | $T_m$ [e], ° C. | $\Delta H_m$ [f], J/g | IV [g], dL/g |
|---|---|---|---|---|---|---|---|
| Example 8 | 10.0:90.0:101.0 | 172 | 322 | 36.0 | 355 | 29.0 | 0.65 |
| Example 9 | 12.5:87.5:101.0 | 176 | 265 | 36.0 | 343 | 35.0 | 0.70 |
| Example 10 | 20.0:80.0:101.0 | 183 | 249 | 22.0 | 331 | 23.0 | 0.96 |
| Example 11 | 15.0:85.0:103.0 | 176 | 278 | 38.0 | 343 | 33.0 | 0.93 |

Wherein
[a] BI is abbreviation of 2-benzimidazolinone, HQ is abbreviation of hydroquinone, BFBB is abbreviation 1,4-bis(4-fluorobenzoyl)benzene;
[b] $T_g$ is the glass transition temperature from second heating scan;
[c] $T_c$ is the crystallization temperature from first cooling scan at cooling rate of 20° C./minute;
[d] $\Delta H_c$ is the enthalpy of crystallization exotherm peak;
[e] $T_m$ is the peak temperature of melting endotherm from second heating scan at 20° C./minute;
[f] $\Delta H_m$ is the enthalpy of the melting endotherm peak; and
[g] IV is the inherent viscosity in 0.5 wt/v % in 96% sulfuric acid at 30° C.

It will be appreciated that the semicrystalline PAEK copolymer described in the Examples have unexpectedly low melting temperature, low crystallization temperature and high glass transition temperatures (in comparison with groups consisting of differing pairwise numerical limitations which group or groups is or are fully defined by its lower and upper bounds, increasing in a regular fashion numerically from lower bounds to upper bounds. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims. All United States patents (and patent applications) referenced herein are herewith and hereby specifically incorporated by reference in their entirety as though set forth in full.

Other than in the working examples or where otherwise indicated, all numbers expressing amounts of materials, reaction conditions, time durations, quantified properties of materials, and so forth, stated in the specification are to be understood as being modified in all instances by the term "about."

It will also be understood that any numerical range recited herein is intended to include all sub-ranges within that range.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The invention claimed is:

1. A polymeric composition comprising a copolymer having a first recurring unit of formula I:

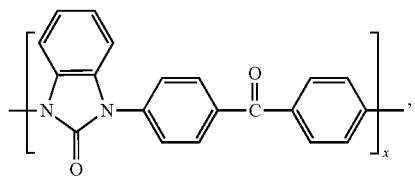

and a second recurring unit of formula II:

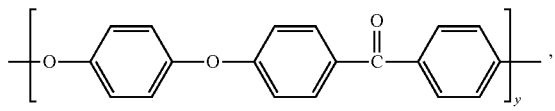

wherein
x is 2 to 5000;
y is 2 to 5000;
a ratio of x:y is 1:99 to 9.5:91.5; and
wherein said polymeric composition is semicrystalline having an inherent solution viscosity greater than 0.3 dL/g, a $T_g$ greater than 150° C., a $T_c$ less than 280° C., a $T_m$ less than 340° C., and an enthalpy of melting endotherm ($\Delta H_m$) greater than 10 J/g and less than 55 J/g; wherein said semicrystalline copolymer crystallizes from a melt at a cooling rate of from 5° C./minute to about 200° C./minute.

2. The composition according to claim 1, wherein the inherent solution viscosity of said semicrystalline copolymer is at least 0.5 dL/g and is less than 3.0 dL/g.

3. The composition according to claim 1, wherein said semicrystalline copolymer has a $T_g$ from greater than 150° C. to 170° C., a $T_m$ from 300° C. to less than 340° C., and a $T_c$ of greater than 210° C. and less than 280° C.

4. The composition according to claim 3, wherein a $T_m$ is greater than the $T_g$ by 145° C. to 195° C.

5. The composition according to claim 1, additionally comprising a polymer selected from the group consisting of polybenzimidazole, polyarylamides, polysulfones, polyketones, polyimides, polyetherimides, polyphenylenesulfides, fluoropolymers, polyamides, polyesters, polycarbonates and mixtures thereof.

6. The composition of claim 1, further comprising a filler selected from the group consisting of fibrous fillers and non-fibrous fillers.

7. The composition according to claim 6, where the weight percent of filler ranges from 10 weight percent to 80 weight percent.

8. The composition according to claim 7, wherein said filler is selected from the group consisting of glass fiber, carbon fiber, carbon black, graphite, graphene, a fluorocarbon resin, and mixtures thereof.

9. The composition comprising the composition of claim 1, further comprising at least one reinforcing filler and one or more additional ingredient(s), selected from the group consisting of colorants, pigments, light stabilizers, UV stabilizers, heat stabilizers, antioxidants, acid scavengers, processing aids, nucleating agents, lubricants, flame retardants, smoke-suppressing agents, anti-static agents, anti-blocking agents, conductivity additives, plasticizers, flow modifiers, extenders, metal deactivators and mixtures thereof.

10. An article of manufacture comprising the polymeric composition of claim 1.

11. A polymeric composition comprising a polymer or copolymer having, a first recurring unit of formula III:

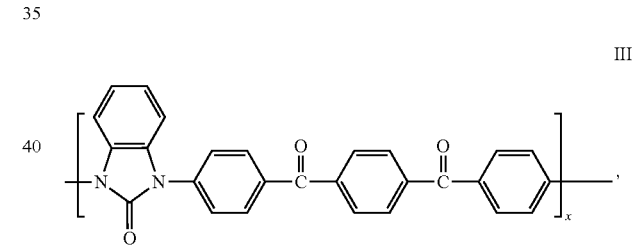

and a second recurring unit of formula IV:

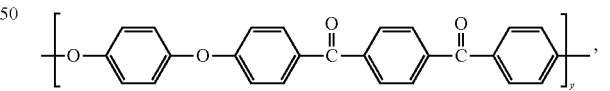

wherein
x is 2 to 5000,
y is 1 to 5000,
a molar ratio of x:y is 1:99 to 25:75, and
wherein said polymeric composition has an inherent solution viscosity greater than 0.3 dL/g.

12. The composition according to claim 11, wherein the inherent solution viscosity of said semi-crystalline copolymer is at least 0.5 dL/g and is less than 3.0 dL/g.

13. The composition according to claim 11, wherein said polymeric composition is semicrystalline having an inherent solution viscosity greater than 0.3 dL/g, a $T_g$ greater than 165° C., a $T_c$ less than 340° C., a $T_m$ less than 365° C., and an enthalpy of melting endotherm ($\Delta H_m$) greater than 10 J/g and less than 55 J/g; and wherein said semicrystalline copolymer crystallizes from a melt at a cooling rate of from 5° C./minute to 200° C./minute.

14. The composition according to claim 13, wherein said semicrystalline copolymer has a $T_g$ from 170° C. to 185° C., a $T_m$ from 300° C. to 360° C., and a $T_c$ from 210° C. to 330° C.

15. The composition according to claim 14, wherein a $T_m$ is greater than the $T_g$ by 145° C. to 195° C.

16. The composition according to claim 11, additionally comprising a polymer selected from the group consisting of polybenzimidazole, polyarylamides, polysulfones, polyketones, polyimides, polyetherimides, polyphenylenesulfides, fluoropolymers, polyamides, polyesters, polycarbonates and mixtures thereof.

17. The composition of claim 11, further comprising a filler selected from the group consisting of fibrous fillers and non-fibrous fillers.

18. The composition according to claim 17, wherein the weight percent of filler ranges from 10 weight percent to 80 weight percent.

19. The composition according to claim 18, wherein said filler is selected from the group consisting of glass fiber, carbon fiber, carbon black, graphite, graphene, a fluorocarbon resin, and mixtures thereof.

20. The composition comprising the composition of claim 11, further comprising at least one reinforcing filler and one or more additional ingredient(s), selected from the group consisting of colorants, pigments, light stabilizers, heat stabilizers, antioxidants, acid scavengers, processing aids, nucleating agents, lubricants, flame retardants, smoke-suppressing agents, anti-static agents, anti-blocking agents, conductivity additives, plasticizers, flow modifiers, extenders, metal deactivators and mixtures thereof.

21. An article of manufacture comprising the polymeric composition of claim 11.

22. A method of making a semicrystalline copolymer, the method a comprising reacting at least one dihalo-derivative of the formula, formula V:

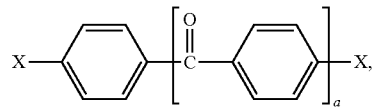

with a mixture of compound of the formula, formula VI:

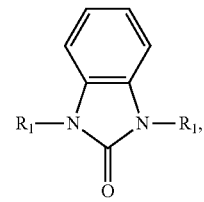

and compound of the formula, formula VII:

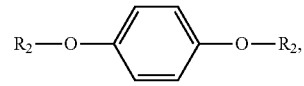

in a hydrophilic organic solvent comprising N-cyclohexyl-2-pyrrolidone in the presence of an alkali metal carbonate or a mixture of alkali metal carbonate from 140 to 290° C.; wherein a is selected from 1 and 2, in a molar ratio (VI:VII) of 9.5:90.5 to 1.0:99.0 wherein a in formula V is selected as 1, or in a molar ratio (VI:VII) of 99:1 to 25:75 wherein a in formula V is selected as 2, each X is selected from a chlorine and fluorine atom, R1 is selected from an alkali metal and a hydrogen atom and R2 is selected from an alkali metal and a hydrogen atom.

\* \* \* \* \*